US009528439B2

(12) United States Patent
Graham et al.

(10) Patent No.: US 9,528,439 B2
(45) Date of Patent: Dec. 27, 2016

(54) SYSTEMS AND APPARATUS RELATING TO DOWNSTREAM FUEL AND AIR INJECTION IN GAS TURBINES

(71) Applicant: General Electric Company, Schenectady, NY (US)

(72) Inventors: Kaitlin Marie Graham, Greenville, SC (US); Krishna Kumar Venkataraman, Simpsonville, SC (US); Lewis Berkley Davis, Jr., Niskayuna, NY (US)

(73) Assignee: General Electric Company, Schenectady, NY (US)

(*) Notice: Subject to any disclaimer, the term of this patent is extended or adjusted under 35 U.S.C. 154(b) by 810 days.

(21) Appl. No.: 13/836,703

(22) Filed: Mar. 15, 2013

(65) Prior Publication Data
US 2014/0260270 A1 Sep. 18, 2014

(51) Int. Cl.
F02C 3/14 (2006.01)
F01D 9/02 (2006.01)
F02C 7/22 (2006.01)
F23R 3/34 (2006.01)

(52) U.S. Cl.
CPC ............. F02C 3/14 (2013.01); F01D 9/023 (2013.01); F02C 7/222 (2013.01); F23R 3/34 (2013.01)

(58) Field of Classification Search
CPC ............. F23R 3/34; F23R 3/346; F01D 9/023; F02C 7/222
See application file for complete search history.

(56) References Cited

U.S. PATENT DOCUMENTS

| 6,240,732 | B1* | 6/2001 | Allan | F02C 7/222 137/561 A |
| 7,603,863 | B2 | 10/2009 | Widener et al. | |
| 8,112,216 | B2 | 2/2012 | Davis, Jr. et al. | |
| 2005/0252218 | A1* | 11/2005 | Chen | F23C 5/32 60/776 |
| 2009/0145137 | A1* | 6/2009 | Rizkalla | F01D 9/023 60/796 |
| 2010/0115953 | A1 | 5/2010 | Davis, Jr. et al. | |
| 2010/0170216 | A1 | 7/2010 | Venkataraman et al. | |
| 2010/0170219 | A1 | 7/2010 | Venkataraman et al. | |
| 2010/0170254 | A1 | 7/2010 | Venkataraman et al. | |
| 2010/0242482 | A1* | 9/2010 | Kraemer | F02C 7/228 60/746 |
| 2011/0179803 | A1* | 7/2011 | Berry | F01D 9/06 60/785 |
| 2011/0271689 | A1* | 11/2011 | Lacy | F01D 9/023 60/806 |

OTHER PUBLICATIONS

US 8,019,523, 09/2011, Davis, Jr. et al. (withdrawn)

* cited by examiner

Primary Examiner — Alexander Comley
Assistant Examiner — Kenneth J Hansen
(74) Attorney, Agent, or Firm — Mark E. Henderson; Ernest G. Cusick; Frank A. Landgraff

(57) ABSTRACT

A gas turbine engine that includes: an interior flowpath defined through a combustor and a turbine; an aft frame forming an interface between the combustor the turbine, the aft frame comprising a rigid structural member that circumscribes the interior flowpath, wherein the aft frame includes an inner wall that defines an outboard boundary of the interior flowpath; a circumferentially extending fuel plenum formed through the aft frame; and outlet ports formed through the inner wall of the aft frame. The outlet ports may be configured to connect the fuel plenum to the interior flowpath.

11 Claims, 19 Drawing Sheets

SYSTEMS AND APPARATUS RELATING TO DOWNSTREAM FUEL AND AIR INJECTION IN GAS TURBINES

BACKGROUND OF THE INVENTION

This present application relates generally to the combustion systems in combustion or gas turbine engines (hereinafter "gas turbines"). More specifically, but not by way of limitation, the present application describes novel methods, systems, and/or apparatus related to the downstream or late injection of air and fuel in the combustion systems of gas turbines.

The efficiency of gas turbines has improved significantly over the past several decades as new technologies enable increases to engine size and higher operating temperatures. One technical basis that allowed higher operating temperatures was the introduction of new and innovative heat transfer technology for cooling components within the hot gas path. Additionally, new materials have enabled higher temperature capabilities within the combustor.

During this time frame, however, new standards were enacted that limit the levels at which certain pollutants may be emitted during engine operation. Specifically, the emission levels of NOx, CO and UHC, all of which are sensitive to the operating temperature of the engine, were more strictly regulated. Of those, the emission level of NOx is especially sensitive to increased emission levels at higher engine firing temperatures and, thus, became a significant limit as to how much temperatures could be increased. Because higher operating temperatures coincide with more efficient engines, this hindered advances in engine efficiency. In short, combustor operation became a significant limit on gas turbine operating efficiency.

As a result, one of the primary goals of advanced combustor design technologies became developing configurations that reduced combustor driven emission levels at these higher operating temperatures so that the engine could be fired at higher temperatures, and thus have a higher pressure ratio cycle and higher engine efficiency. Accordingly, as it will be appreciated, novel combustion system designs that reduce emissions, particular that of NOx, and enable higher firing temperatures would be in great commercial demand.

BRIEF DESCRIPTION OF THE INVENTION

The present application thus describes a gas turbine engine that includes: an interior flowpath defined through a combustor and a turbine; an aft frame forming an interface between the combustor the turbine, the aft frame comprising a rigid structural member that circumscribes the interior flowpath, wherein the aft frame includes an inner wall that defines an outboard boundary of the interior flowpath; a circumferentially extending fuel plenum formed through the aft frame; and outlet ports formed through the inner wall of the aft frame. The outlet ports may be configured to connect the fuel plenum to the interior flowpath.

The present application further describes an annular structural member configured to wraparound an interior flowpath that extends between a combustor and a turbine within a gas turbine engine, the annular structural member including: connecting means by which the annular structural member connects to the combustor and the turbine; an inner wall that, in operation, defines an outboard boundary of the interior flowpath; a circumferentially extending fuel plenum formed within the annual structural member frame; a fuel inlet port formed through an outer wall of the aft frame; air inlet ports formed through the outer wall of the aft frame; and outlet ports formed through the inner wall of the aft frame that fluidly connect the fuel plenum to the interior flowpath.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
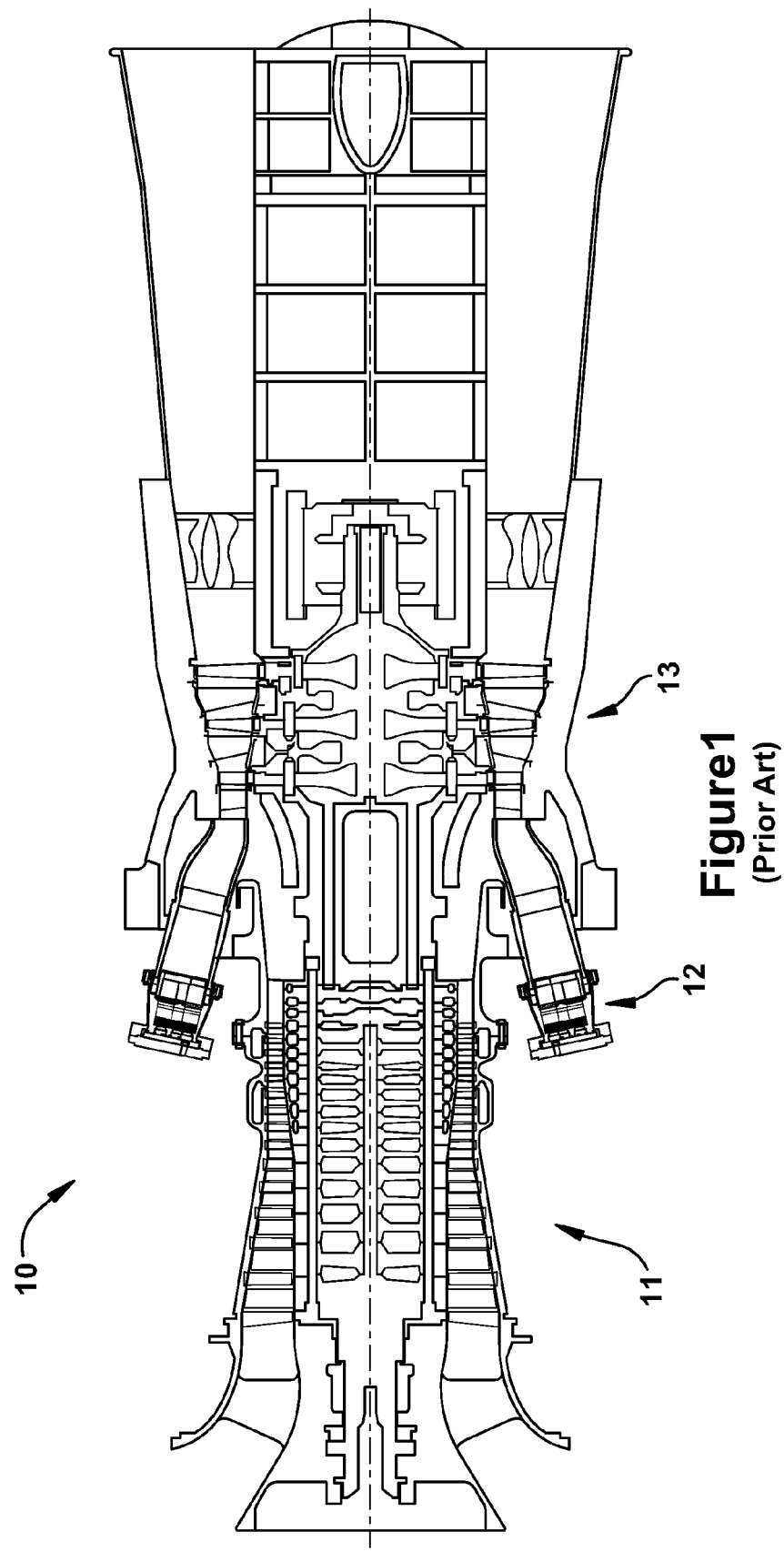
FIG. 1 is a sectional schematic representation of an exemplary gas turbine in which certain embodiments of the present application may be used.

While the following examples of the present invention may be described in reference to particular types of turbine engine, those of ordinary skill in the art will appreciate that the present invention may not be limited to such use and applicable to other types of turbine engines, unless specifically limited therefrom. Further, it will be appreciated that in describing the present invention, certain terminology may be used to refer to certain machine components within the gas turbine engine. Whenever possible, common industry terminology will be used and employed in a manner consistent with its accepted meaning. However, such terminology should not be narrowly construed, as those of ordinary skill in the art will appreciate that often a particular machine component may be referred to using differing terminology. Additionally, what may be described herein as being single component may be referenced in another context as consisting of multiple components, or, what may be described herein as including multiple components may be referred to elsewhere as a single one. As such, in understanding the scope of the present invention, attention should not only be paid to the particular terminology, but also the accompanying description, context, as well as the structure, configuration, function, and/or usage of the component, particularly as may be provided in the appended claims.

Several descriptive terms may be used regularly herein, and it may be helpful to define these terms at the onset of this section. Accordingly, these terms and their definitions, unless stated otherwise, are as follows. As used herein, "downstream" and "upstream" are terms that indicate direction relative to the flow of a fluid, such as, for example, the working fluid through the compressor, combustor and turbine sections of the gas turbine, or the flow coolant through one of the component systems of the engine. The term "downstream" corresponds to the direction of fluid flow, while the term "upstream" refers to the direction opposite or against the direction of fluid flow. The terms "forward" and "aft", without any further specificity, refer to directions relative to the orientation of the gas turbine, with "forward" referring to the forward or compressor end of the engine, and "aft" referring to the aft or turbine end of the engine, the alignment of which is illustrated in FIG. 1.

Additionally, given a gas turbine engine's configuration about a central axis as well as this same type of configuration in some component systems, terms describing position relative to an axis likely will be used. In this regard, it will be appreciated that the term "radial" refers to movement or position perpendicular to an axis. Related to this, it may be required to describe relative distance from the central axis. In this case, for example, if a first component resides closer to the center axis than a second component, it will be stated herein that the first component is "radially inward" or "inboard" of the second component. If, on the other hand, the first component resides further from the axis than the second component, it may be stated herein that the first component is "radially outward" or "outboard" of the second component. Additionally, it will be appreciated that the term "axial" refers to movement or position parallel to an axis. And, finally, the term "circumferential" refers to movement or position around an axis. As mentioned, while these terms may be applied in relation to the common center axis or shaft that typically extends through the compressor and turbine sections of the engine, they also may be used in relation to other components or sub-systems. For example, in the case of a cylindrically shaped "can-type" combustor, which is common to many machines, the axis which gives these terms relative meaning may be the longitudinal reference axis that is defined through the center of the cylindrical, "can" shape for which it is named or the more annular, downstream shape of the transition piece.

Referring now to FIG. 1, by way of background, an exemplary gas turbine 10 is provided in which embodiments of the present application may be used. In general, gas turbine engines operate by extracting energy from a pressurized flow of hot gas produced by the combustion of a fuel in a stream of compressed air. As illustrated in FIG. 1, the combustion turbine engine 10 includes an axial compressor 11 that is mechanically coupled via a common shaft to a downstream turbine section or turbine 13, with a combustor 12 positioned therebetween. As shown, the compressor 11 includes a plurality of stages, each of which includes a row of compressor rotor blades followed by a row of compressor stator blades. The turbine 13 also includes a plurality of stages. Each of the turbine stages includes a row of turbine buckets or rotor blades followed by a row of turbine nozzles stator blades, which remain stationary during operation. The turbine stator blades generally are circumferentially spaced one from the other and fixed about the axis of rotation. The rotor blades may be mounted on a rotor wheel that connects to the shaft.

In operation, the rotation of compressor rotor blades within the compressor 11 compresses a flow of air which is directed into the combustor 12. Within the combustor 12, the compressed air is mixed with a fuel and ignited so to produce an energized flow of working fluid which then may be expanded through the turbine 13. Specifically, the working fluid from the combustor 12 is directed over the turbine rotor blades such that rotation is induced, which the rotor wheel then translates to the shaft. In this manner, the energy of the flow of working fluid is transformed into the mechanical energy of the rotating shaft. The mechanical energy of the shaft then may be used to drive the rotation of the compressor rotor blades so to produce the necessary supply of compressed air, and, for example, to drive a generator to produce electricity.

Figure 2:
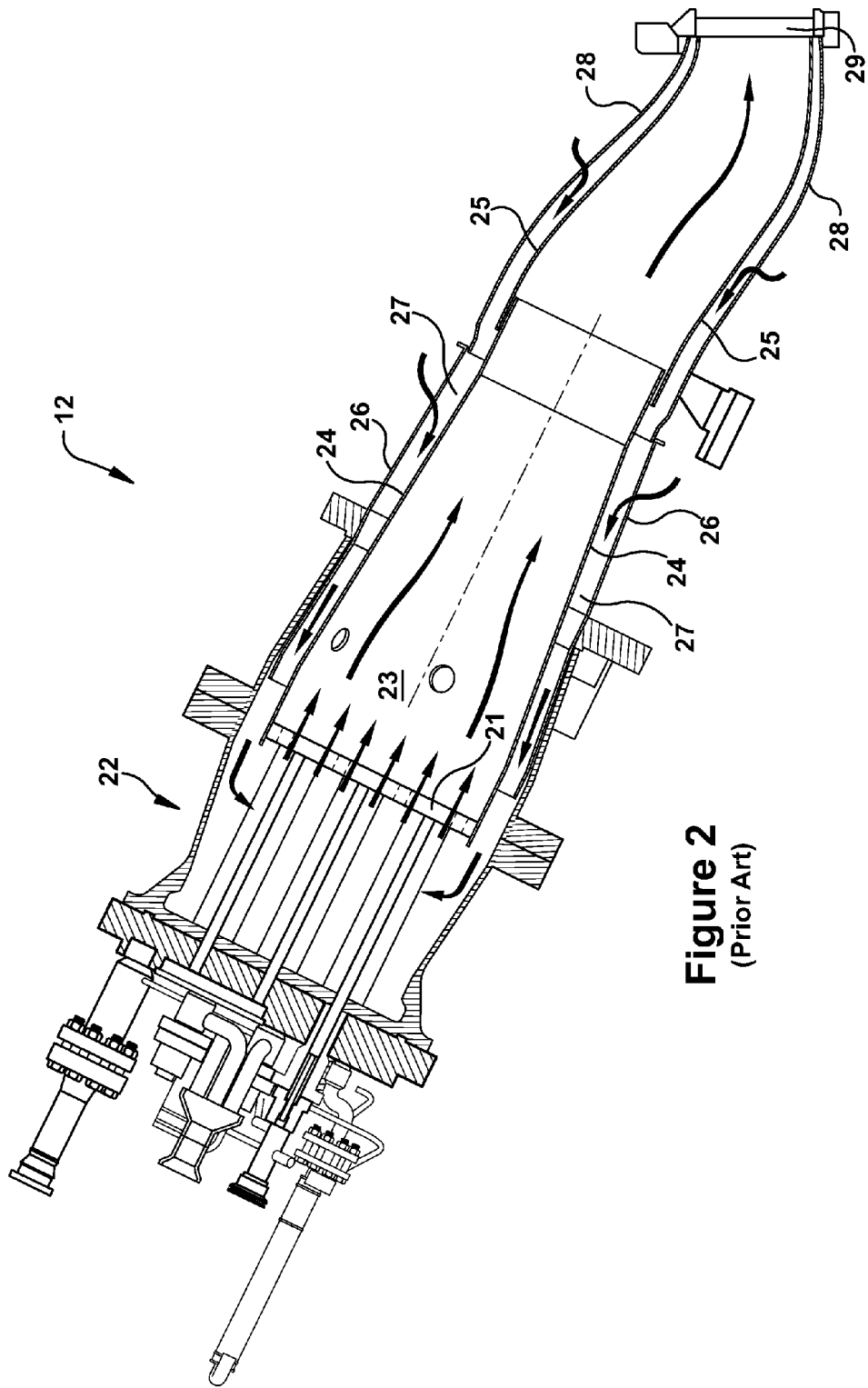
FIG. 2 is a sectional schematic representation of a conventional combustor in which embodiments of the present invention may be used.

FIG. 2 is a section view of a conventional combustor in which embodiments of the present invention may be used. The combustor 20, however, may take various forms, each of which being suitable for including various embodiments of the present invention. Typically, the combustor 20 includes multiple fuel nozzles 21 positioned at a headend 22. It will be appreciated that various conventional configurations for fuel nozzles 21 may be used with the present invention. Within the headend 22, air and fuel are brought together for combustion within a combustion zone 23, which is defined by a surrounding liner 24. The liner 24 typically extends from the headend 22 to a transition piece 25. The liner 24, as shown, is surrounded by a flow sleeve 26, and, similarly, the transition piece 25 is surrounded by an impingement sleeve 28. Between the flow sleeve 26 and the liner 24 and the transition piece 25 and impingement sleeve 28, it will be appreciated that an annulus, which will be referred to herein as a "flow annulus 27", is formed. The flow annulus 27, as shown, extends for a most of the length of the combustor 20. From the liner 24, the transition piece 25 transforms the flow from the circular cross section of the liner 24 to an annular cross section as it extends downstream toward the turbine 13. At a downstream end, the transition piece 25 directs the flow of the working fluid toward the first stage of the turbine 13.

It will be appreciated that the flow sleeve 26 and impingement sleeve 28 typically have impingement apertures (not shown) formed therethrough which allow an impinged flow of compressed air from the compressor 12 to enter the flow annulus 27 formed between the flow sleeve 26/liner 24 and/or the impingement sleeve 28/transition piece 25. The flow of compressed air through the impingement apertures convectively cools the exterior surfaces of the liner 24 and transition piece 25. The compressed air entering the combustor 20 through the flow sleeve 26 and the impingement sleeve 28 is directed toward the forward end of the combustor 20 via the flow annulus 27. The compressed air then enters the fuel nozzles 21, where it is mixed with a fuel for combustion.

Figure 4:
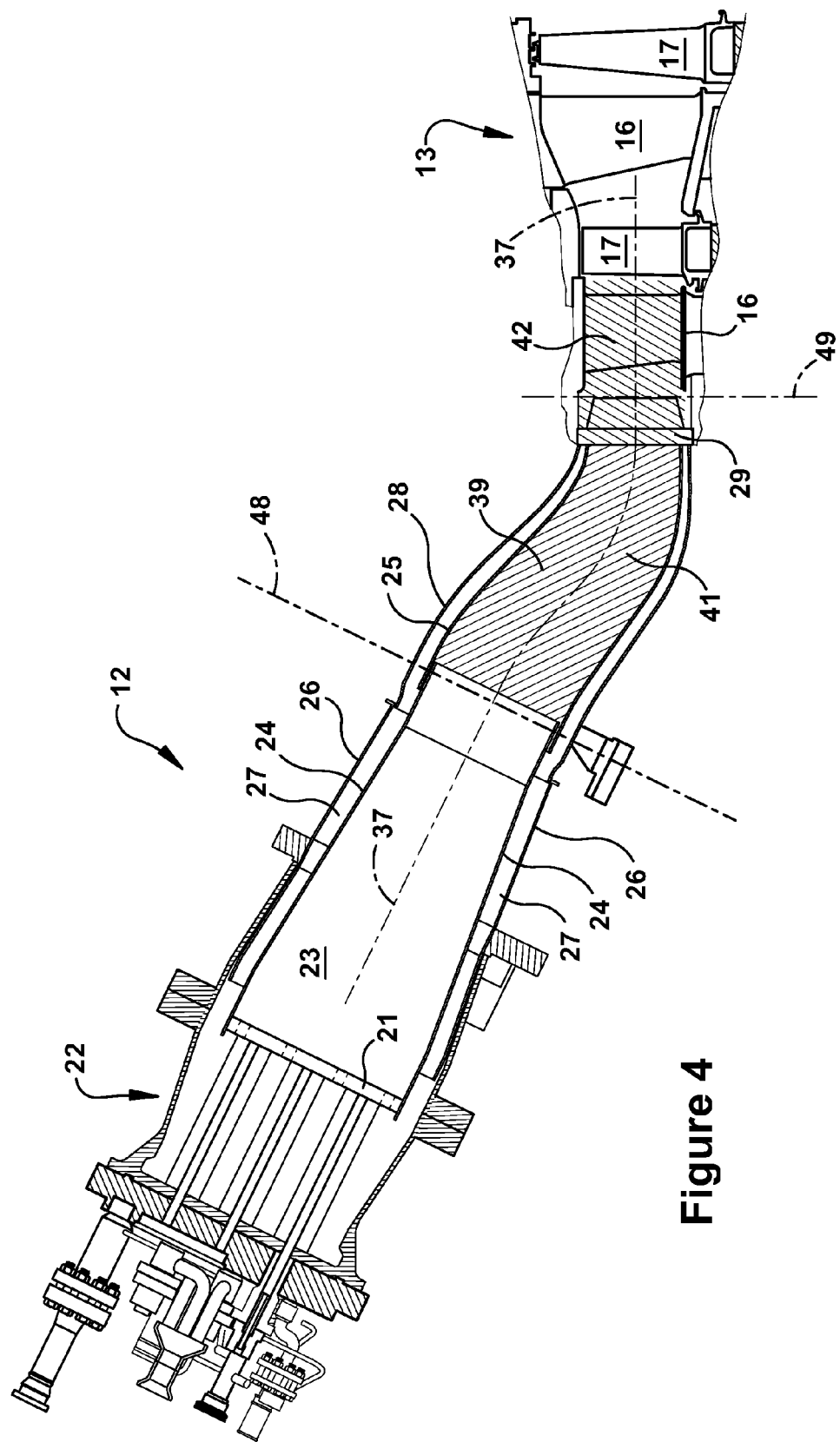
FIG. 4 is a sectional schematic representation of a combustor and the upstream stages of a turbine according to aspects of an exemplary embodiment of the present invention.

The turbine 13 typically has multiple stages, each of which includes two axial stacked rows of blades: a row of stator blades 16 followed by a row of rotor blades 17, as shown in FIGS. 1 and 4. Each of the blade rows include many blades circumferentially spaced about the center axis of the turbine 13. At a downstream end, the transition piece 25 includes an outlet and aft frame 29 that directs the flow of combustion products into the turbine 13, where it interacts with the rotor blades to induce rotation about the shaft. In this manner, the transition piece 25 serves to couple the combustor 20 and the turbine 13.

Figure 3:
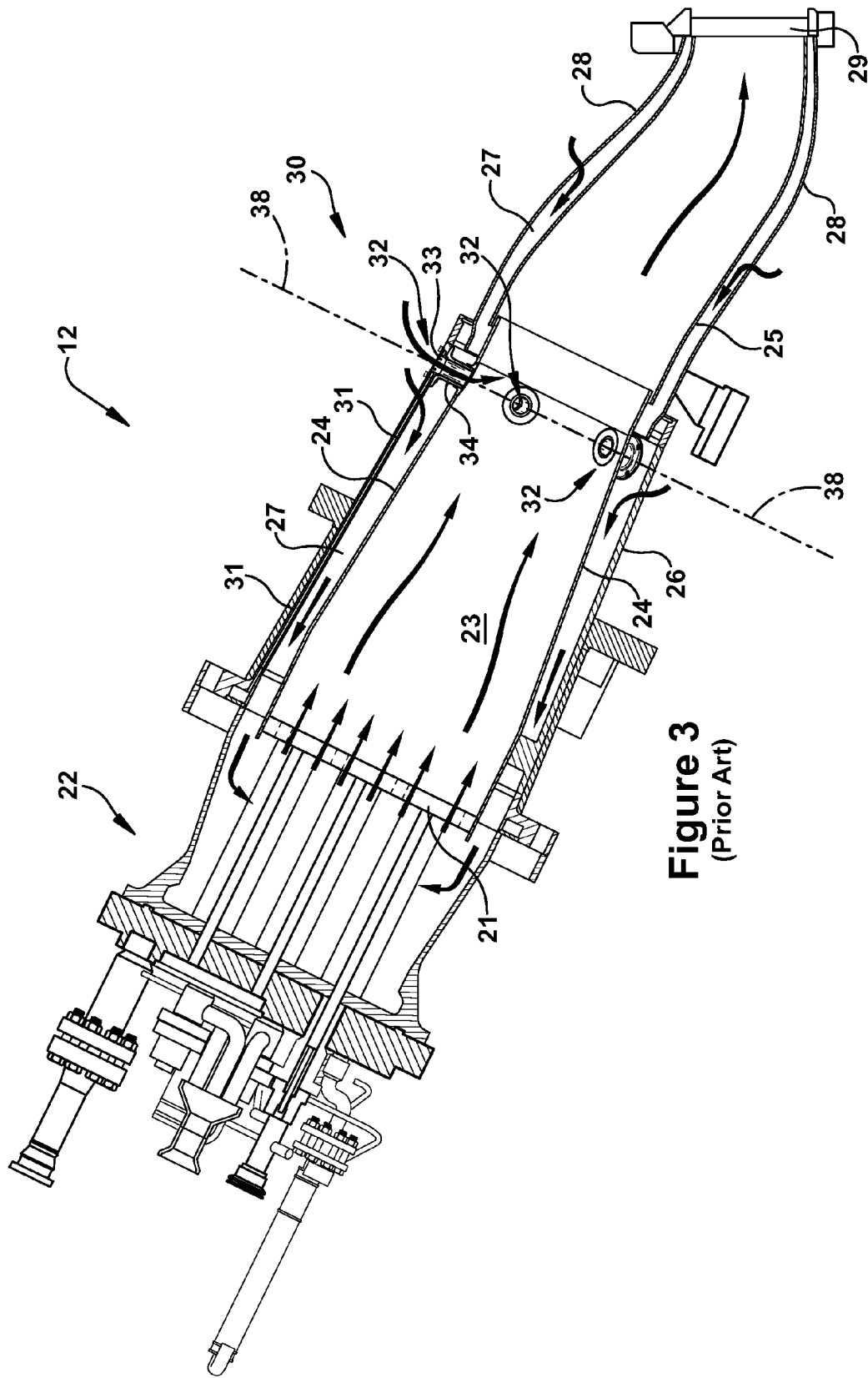
FIG. 3 is a sectional schematic representation of a conventional combustor that includes a single stage of downstream fuel injectors according to a conventional design.

FIG. 3 illustrates a view of a combustor 12 that includes supplemental or downstream fuel/air injection. It will be appreciated that such supplemental fuel/air injection is often referred to as late lean injection or axially staged injection. As used herein, this type of injection will be referred to as "downstream injection" because of the downstream location of the fuel/air injection relative to the primary fuel nozzles 21 positioned at the headend 22. It will be appreciated that the downstream injection system 30 of FIG. 3 is consistent with a conventional design and is provided merely for exemplary purposes. As shown, the downstream injection system 30 may include a fuel passageway 31 defined within the flow sleeve 26, though other types of fuel delivery are possible. The fuel passageway 31 may extend to injectors 32, which, in this example, are positioned at or near the aft end of the liner 24 and flow sleeve 26. The injectors 32 may include a nozzle 33 and a transfer tube 34 that extends across the flow annulus 27. Given this arrangement, it will be appreciated that each injector 32 bring together a supply of compressed air derived from the exterior of the flow sleeve 26 and a supply of fuel delivered through the nozzle 33 and inject this mixture into the combustion zone 23 within the liner 24. As shown, several fuel injectors 32 may be positioned circumferentially around the flow sleeve 26/liner 24 assembly so that a fuel/air mixture is introduced at multiple points around the combustion zone 23. The several fuel injectors 32 may be positioned at the same axial position. That is, the several injectors are located as the same position along the center axis 37 of the combustor 12. As used herein, fuel injectors 32 having this configuration may be described as being positioned on a common injection plane 38, which, as shown, is a plane perpendicular to the center axis 37 of the combustor 12. In the exemplary conventional design of FIG. 3, the injection plane 36 is positioned at the rearward or downstream end of the liner 24.

Turning to the FIGS. 4 through 19 and the invention of the present application, it will be appreciated that the level of gas turbine emissions depend upon many operating criteria. The temperatures of reactants in the combustion zone is one of these factors and has been shown to affect certain emission levels, such as NOx, more than others. It will be appreciated that the temperature of the reactants in the combustion zone is proportionally related to the exit temperature of the combustor, which correspond to higher pressure ratios, and, further, that higher pressure ratios enable improved efficiency levels in such Brayton Cycle type engines. Because it has been found that the emission levels of NOx has a strong and direct relationship to reactant temperatures, modern gas turbines have only been able to maintain acceptable NOx emission level while increasing firing temperatures through technological advancements such as advanced fuel nozzle design and premixing. Subsequent to those advancements, late or downstream injection was employed to enable further increases in firing temperature, as it was found that shorter residence times of the reactants at the higher temperatures within the combustion zone decreased NOx levels. Specifically, it has been shown that, at least to a degree, controlling residence time may be used to control NOx emission levels.

Such downstream injection, which is also referred to as "late lean injection", introduces a portion of the air and fuel supply downstream of the main supply of air and fuel delivered to the primary injection point within the headend or forward end of the combustor. It will be appreciated that such downstream positioning of the injectors decreases the time the combustion reactants remain within the higher temperatures of the flame zone within the combustor. Specifically, due to the substantially constant velocity of the flow of fluid through the combustor, shortening the distance via downstream injection that reactants must travel before exiting the flame zone results in reduced time those reactants reside at the high temperatures in the flame zone, which, as stated, reduces the formation of NOx and NOx emission levels for the engine. This has allowed advanced combustor designs that couple advanced fuel/air mixing or pre-mixing technologies with the reduced reactant residence times of downstream injection to achieve further increases in combustor firing temperature and, importantly, more efficient engines, while also maintaining acceptable NOx emission levels.

However, other considerations limit the manner in which and the extent to which downstream injection may be done. For example, downstream injection may cause emission levels of CO and UHC to rise. That is, if fuel is injected in too large of quantities at locations that are too far downstream in the combustion zone, it may result in the incomplete combustion of the fuel or insufficient burnout of CO. Accordingly, while the basic principles around the notion of late injection and how it may be used to affect certain emissions may be known generally, challenging design obstacles remain as how this strategy may be optimized so that to enable higher combustor firing temperatures. Accordingly, novel combustor designs and technologies that enable the further optimization of residence time in efficient and cost-effective ways are important areas for further technological advancement, which, as discussed below, is the subject of this application.

One aspect of the present invention proposes an integrated two stage injection approach to downstream injection. Each stage, as discussed below, may be axially spaced so to have a discrete axial location relative to the other within the far aft portions of the combustor 12 and/or upstream regions of the turbine 13. With reference now to FIG. 4, a sectional portion of a gas turbine engine 10 is illustrated that, according to aspects of the present invention, shows approximate ranges (shaded portion) for the placement of each of the two stages of late injection. More specifically, a downstream injection system 30 according to the present invention may include two integrated axial stages of injection within a transition zone 39, which is the portion of the interior flowpath defined within the transition piece 25 of the combustor 12, or the interior flowpath defined downstream within the first stage of the turbine 13. The two axial stages of the present invention include what will be referred herein to as an upstream or "first stage 41" and a downstream or "second stage 42". According to certain embodiments, each of these axial stages include a plurality of injectors 32. The injectors 32 within each of the stages may be circumferentially spaced at the approximately same axial position within either the transition zone 39 or forward portion of the turbine 13. Injector 32 configured in this manner (i.e., injectors 32 being circumferentially spaced on a common axial plane) will be described herein as having a common injection plane 38, as discussed in more detail in relation to FIGS. 5 through 7. Pursuant to preferred embodiments, the injectors at each of the first and second stages 41, 42 may be configured to inject both air and fuel at each location.

FIG. 4 illustrates axially ranges within which each of the first stage 41 and the second stage 42 may be located according to preferred embodiments. To define preferred axial positioning, it will be appreciated that, given the sectional or profile view of FIGS. 5 through 7, the combustor 12 and turbine 13 may be described as defining an interior flowpath extending about a longitudinal center axis 37 from an upstream end near the headend 22 of the combustor 12 through to a downstream end in the turbine 13 section. Accordingly, the positioning of each of the first and second stage 41, 42 may be defined relative to the location of each along the longitudinal axis 37 of the interior flowpath. As also indicated in FIG. 4, certain reference planes formed perpendicular to longitudinal center axis 37 may be defined that provide further definition to axial positions within this region of the turbine. The first of these is a combustor mid-plane 48, which is a perpendicular plane relative to center axis 37 which is positioned at the approximate axial midpoint of the combustor 12, i.e., about halfway between the fuel nozzles 21 of the headend 22 and the downstream end of the combustor 12. It will be appreciated that the combustor mid-plane 48 typically occurs near the location at which the liner 24/flow sleeve 26 assembly gives way to the transition piece 25/impingement sleeve 28 assembly. The second reference planes, which, as illustrated, is defined at the aft end of the combustor 12, is referred to herein as the combustor end-plane 49. The combustor end-plane 49 marks the far, downstream end of the aft frame 29.

According to preferred embodiments, as shown in FIG. 4, the downstream injection system 30 of the present invention may include two axial stages of injection, a first stage 41 and a second stage 42, that are positioned aft of the combustor mid-plane. More specifically, the first stage 41 may be positioned in the aft half of the transition zone 39, and the second stage 42 may be positioned between the first stage 41 and the first row of stator blades 16 in the turbine 13. More preferably, the first stage 41 may be positioned very late within the aft portions of the combustor 12, and the second stage 42 near or downstream of the end-plane 49 of the combustor 12. In certain cases, the first and second stages 41, 42 may be positioned near each other so that common air/fuel conduits may be employed.

Turning now to FIGS. 5 through 10, several preferred embodiments are provided that illustrated further aspects of the present invention as it relates to a two staged system. Each of these figures includes a sectional view of an interior flowpath through an exemplary combustor 12 and turbine 13. As one of ordinary skill in the art will appreciate, the headend 22 and fuel nozzles 21, which may also be referred to herein as the primary air and fuel injection system, may include any of several configurations, as the operation of the present invention is not dependent upon any specific one. According to certain embodiments, the headend 22 and fuel nozzles 21 may be configured to be compatible with late lean or downstream injection systems, as described and defined in U.S. Pat. No. 8,019,523, which is hereby incorporated by reference in its entirety. Downstream of the headend 22, a liner 24 may define a combustion zone 23 within which much of the primary supply of air and fuel delivered to the headend 22 is combusted. A transition piece 25 then may extend downstream from the liner 24 and define a transition zone 39, and at the downstream end of the transition piece 25, an aft frame 29 may direct the combustion products toward the initial row of stator blades 16 in the turbine 13.

Each of these first and second stages 41, 42 of injection may include a plurality of circumferentially spaced injectors 32. The injectors 32 within each of the axial stages may be positioned on a common injection plane 38, which is a perpendicular reference plane relative to the longitudinal axis 37 of the interior flowpath. The injectors 32, which are represented in a simplified form in FIGS. 5 through 7 for the sake of clarity, may include any conventional design for the injection of air and fuel into the downstream or aft end of the combustor 12 or the first stage within the turbine 13. The injectors 32 of either stage 41, 42 may include the injector 32 of FIG. 3, as well as any of those described or referenced in U.S. Pat. Nos. 8,019,523 and 7,603,863, both of which are incorporated herein by reference, any of those described below in relation to FIGS. 14 through 19, as well as other conventional combustor fuel/air injectors. As provided in the incorporated references, the fuel/air injectors 32 of the present invention may also include those integrated within the row of stator blades 16 according to any conventional means and apparatus, such as, for example, those described in U.S. Pat. No. 7,603,863. For injectors 32 within the transition zone 39, each may be structurally supported by the transition piece 25 and/or the impingement sleeve 28, and, in some cases, may extend into the transition zone 39. The injectors 32 may be configured to inject air and fuel into the transition zone 39 in a direction that is generally transverse to a predominant flow direction through the transition zone 39. According to certain embodiments, each axial stage of the downstream injection system 30 may include several injectors 32 that are circumferentially spaced at regular intervals or, in other cases, at uneven intervals. As an example, according to a preferred embodiment, between 3 and 10 injectors 32 may be employed at each of the axial stages. In other preferred embodiments, the first stage may include between 3 and 6 injectors and the second stage (and a third stage, if present) may each comprises between 5 and 10 injectors. In regard to their circumferential placement, the injectors 32 between the two axial stages 41, 42 may be placed in-line or staggered with respect to one another, and, as discussed below, may be placed to supplement the other. In preferred embodiments, the injectors 32 of the first stage 41 may be configured to penetrate the main flow more than the injectors 32 of the second stage 42. In preferred embodiments, this may result in the second stage 42 having more injectors 32 positioned about the circumference of the flowpath than the first stage 41. The injectors of the first stage, the second stage, and a third stage, if present, each may be configured that, in operation, injectors injects air and fuel in a direction between +30° and −30° to a reference line that is perpendicular relative a predominant direction of the flow through the interior flowpath.

Figure 5:
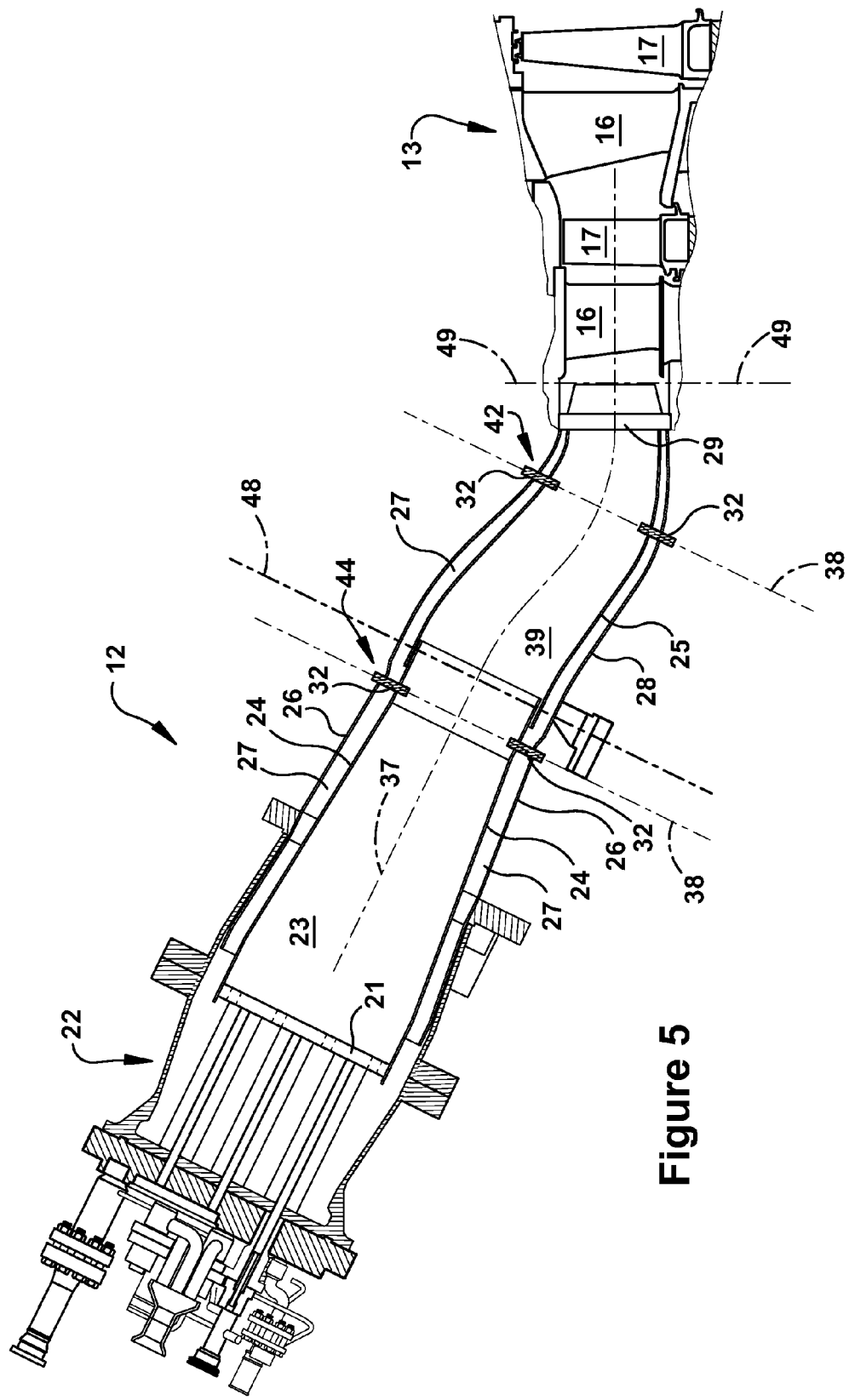
FIG. 5 is a sectional schematic representation of a combustor and the upstream stages of a turbine according to an alternative embodiment of the present invention.
Figure 6:
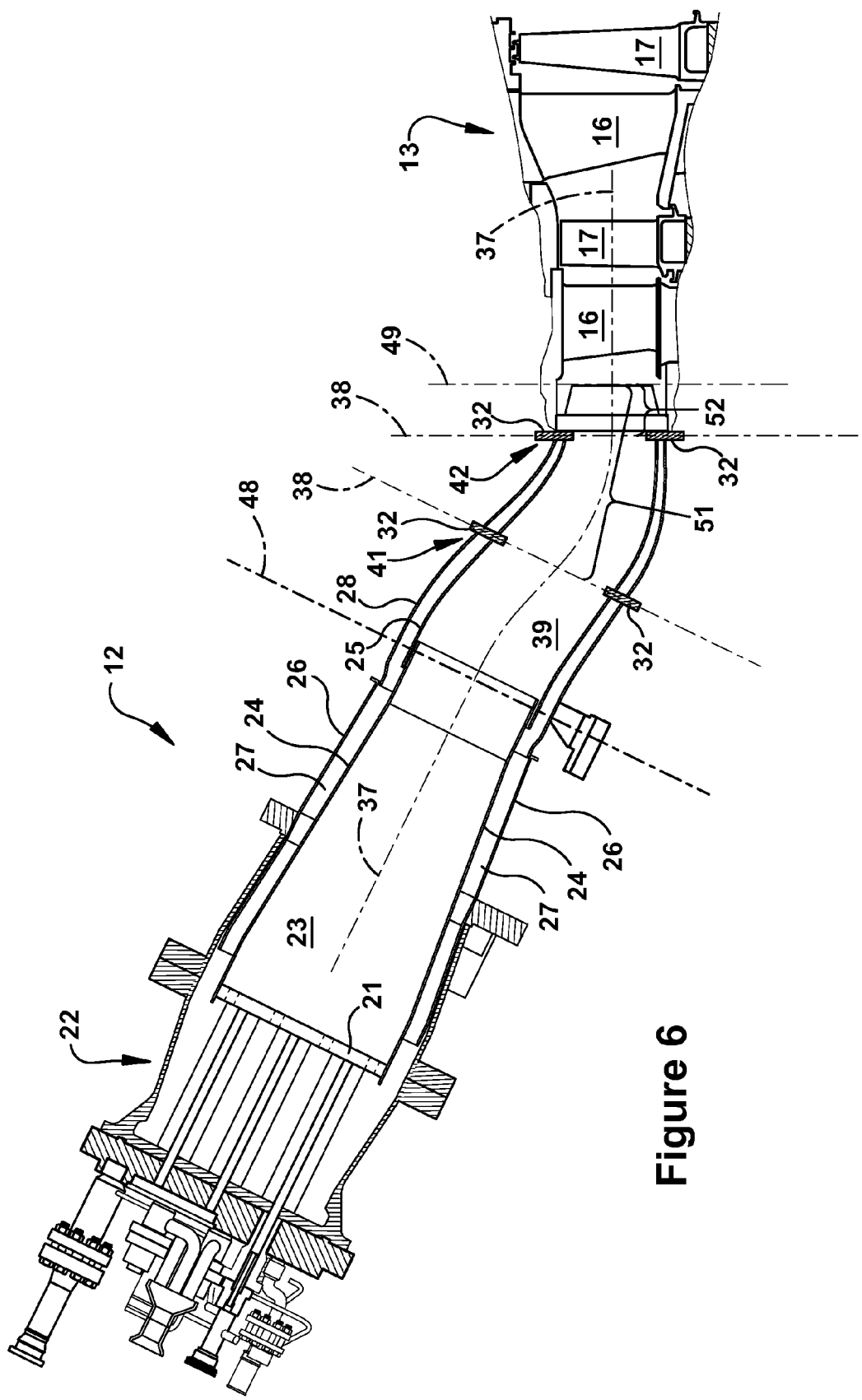
FIG. 6 is a sectional schematic representation of a combustor and the upstream stages of a turbine according to an alternative embodiment of the present invention.

In regard to the axial positioning of the first stage 41 and second stage 42 of a downstream injection system 30, in the preferred embodiments of FIGS. 5 and 6, the first stage 41 may be positioned just upstream or downstream of the combustor mid-plane 48, and the second stage 42 may be positioned near the end-plane 49 of the combustor 12. In certain embodiments, the injection plane 38 of the first stage 41 may be disposed within the transition zone 39, approximately halfway between the combustor mid-plane 48 and the end-plane 49. The second stage 42, as shown in FIG. 5, may be positioned just upstream of the downstream end of the combustor 12 or the end-plane 49. Put another way, the injection plane 38 of the second stage 42 may occur just upstream of the upstream end of the aft frame 29. It will be appreciated that the downstream position of the first and second stage 41, 42 reduce the time for the reactants injected therefrom reside within the combustor. That is, given the relative constant velocity of the flow through the combustor 13, the decrease in residence time relates directly to the distance reactants must travel before reaching the downstream termination of the combustor or flame zone. Accordingly, as discussed in more detail below, the distance 51 for the first stage 41 (as shown in FIG. 6, results in a residence time for injected reactants that is a small fraction of that for reactants released at the headend 22. Similarly, the distance 52 for the second stage 42 results in a residence time for injected reactants that is a small fraction of that for reactants released at the first stage 41. As stated, this decreased residence time reduces NOx emission levels. As discussed in more detail below, in certain embodiments the precise placement of the injection stages relative to the primary fuel and air injection system and each other may depend on the expected residence times given axial location and calculated flow rate through the combustor.

Figure 7:
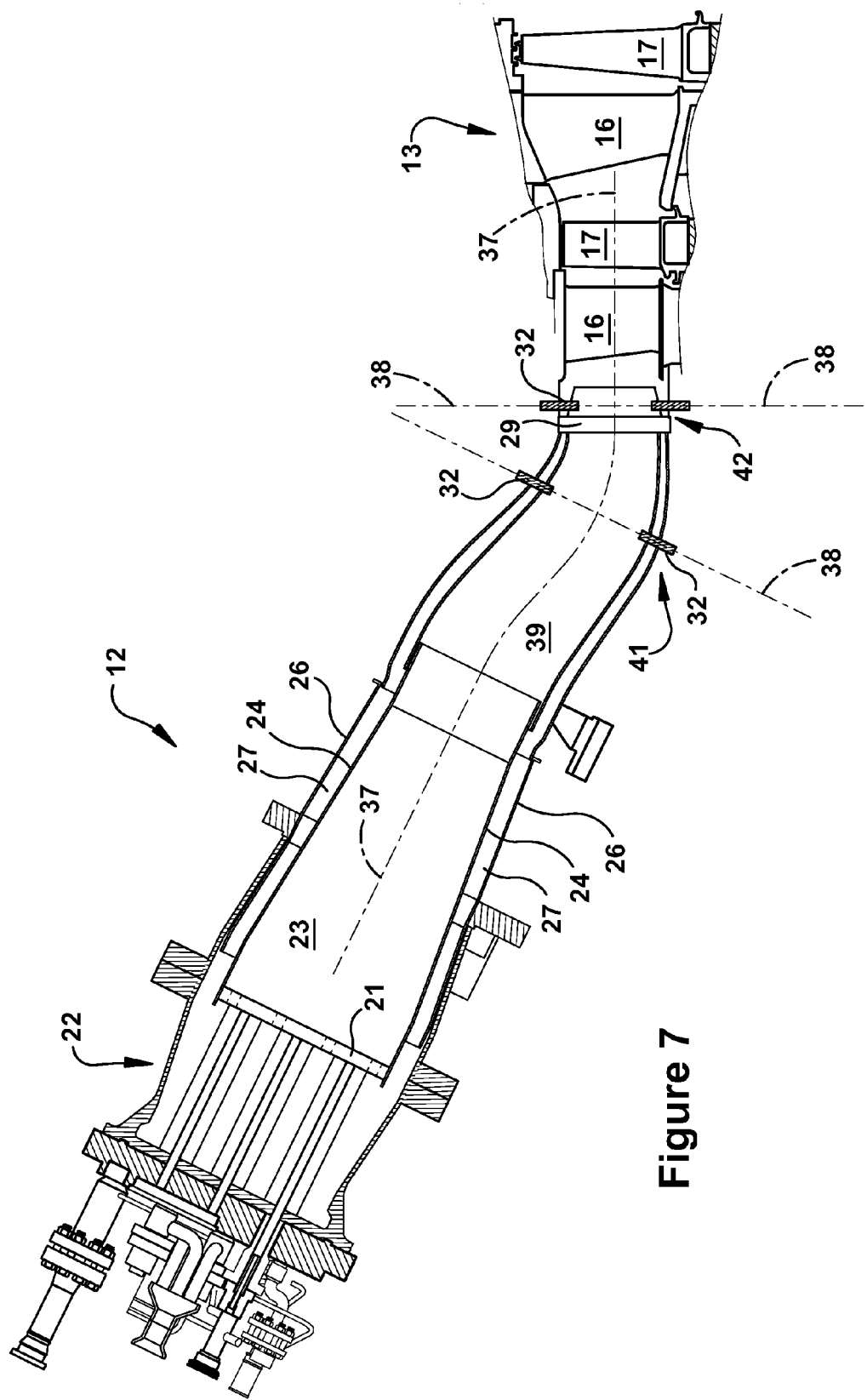
FIG. 7 is a sectional schematic representation of a combustor and the upstream stages of a turbine according to an alternative embodiment of the present invention.

In another exemplary embodiment, as shown in FIG. 7, the injection plane 38 of the first stage 41 may be positioned in the aft quarter of the transition piece 25, which, as illustrated, is slightly further downstream in the combustor 12 than the first stage 41 of FIG. 5. In this case, the injection plane 38 of the second stage 42 may be positioned at the aft frame 29 or very near the end-plane 49 of the combustor 12. In such a case, according to a preferred embodiment, the injectors 32 of the second stage 42 may be integrated into the structure of the aft frame 29.

Figure 8:
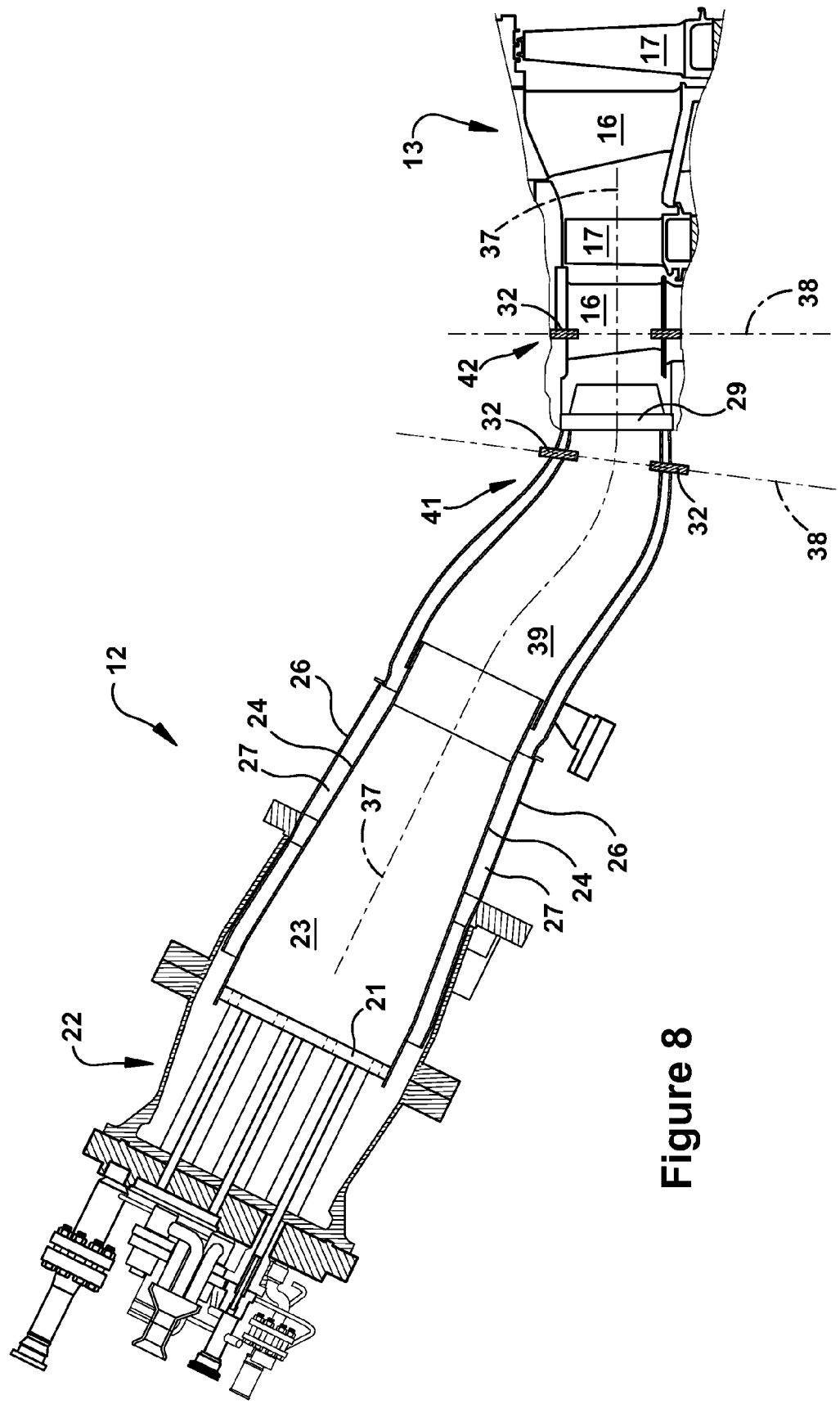
FIG. 8 is a sectional schematic representation of a combustor and the upstream stages of a turbine according to an alternative embodiment of the present invention.
Figure 9:
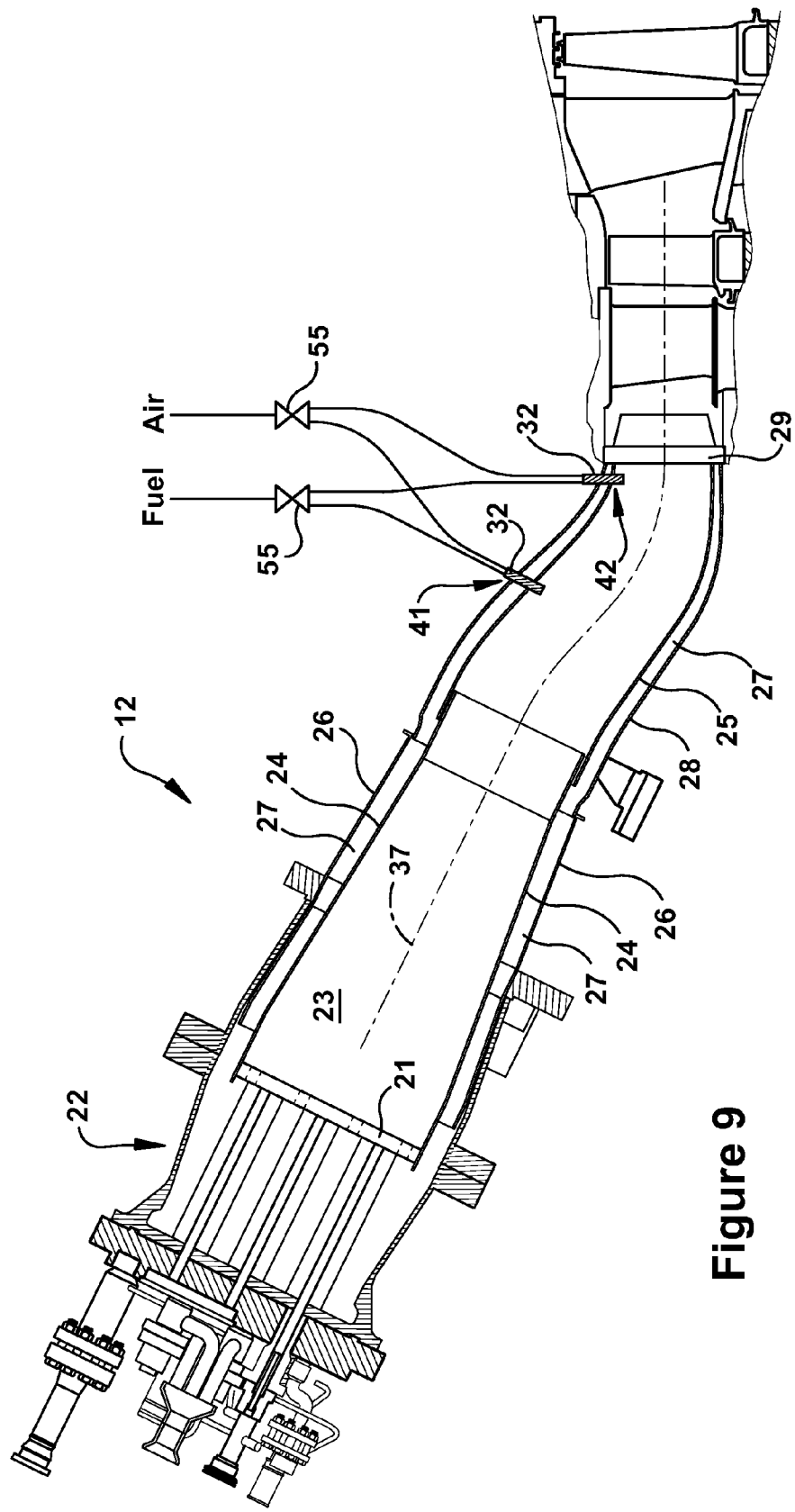
FIG. 9 is a sectional schematic representation of a combustor and the upstream stages of a turbine according to an alternative embodiment of the present invention.

In another exemplary embodiment, as shown in FIG. 8, the injection plane 38 of the first stage 41 may be positioned just slightly upstream of the aft frame 29 or the end-plane 49 of the combustor 12. The second stage 42 may be positioned at or very near the axial position of the first row of stator blades 16 within the turbine 13. In preferred embodiments, the injectors 32 of the second stage 42 may be integrated into this row of stator blades 16, as mentioned above.

The present invention also includes control configurations for distributing air and fuel between the primary air and fuel injection system of the headend 22 and the first stage 41 and the second stage 42 of the downstream injection system. Relative to each other, according to preferred embodiments, the first stage 41 may be configured to inject more fuel than the second stage 42. In certain embodiments, the fuel injected at the second stage 42 is less than 50% of the fuel injected at the first stage. In other embodiments, the fuel injected at the second stage 42 between approximately 10% and 50% of fuel injected at the first stage 41. Each of the first and second stages 41, 42 may be configured to inject an approximate minimum amount of air given the fuel injected, which may be determined by analysis and testing, to approximately minimize the NOx versus combustor exit temperature, while also allowing adequate CO burnout. Other preferred embodiments include more specific levels of air and fuel distribution the primary air and fuel injection system of the headend 22 and the first stage 41 and the second stage 42 of the downstream injection system. For example, in one preferred embodiment, the distribution of the fuel include: between 50% and 80% of the fuel to the primary air and fuel injection system; between 20% and 40% to the first stage 41; and between 2% and 10% to the second stage. In such cases, the distribution of air may include: between 60% and 85% of the air to the primary air and fuel injection system; between 15% and 35% to the first stage 41, and between 1% and 5% to the second stage 42. In another preferred embodiment, such air and fuel splits may be defined even more precisely. In this case, the air and fuel split between the primary air and fuel injection system, the first stage 41 and the second stage 42 is as follows: 70/25/5% for the fuel and 80/18/2% for the air, respectively.

Figure 10:
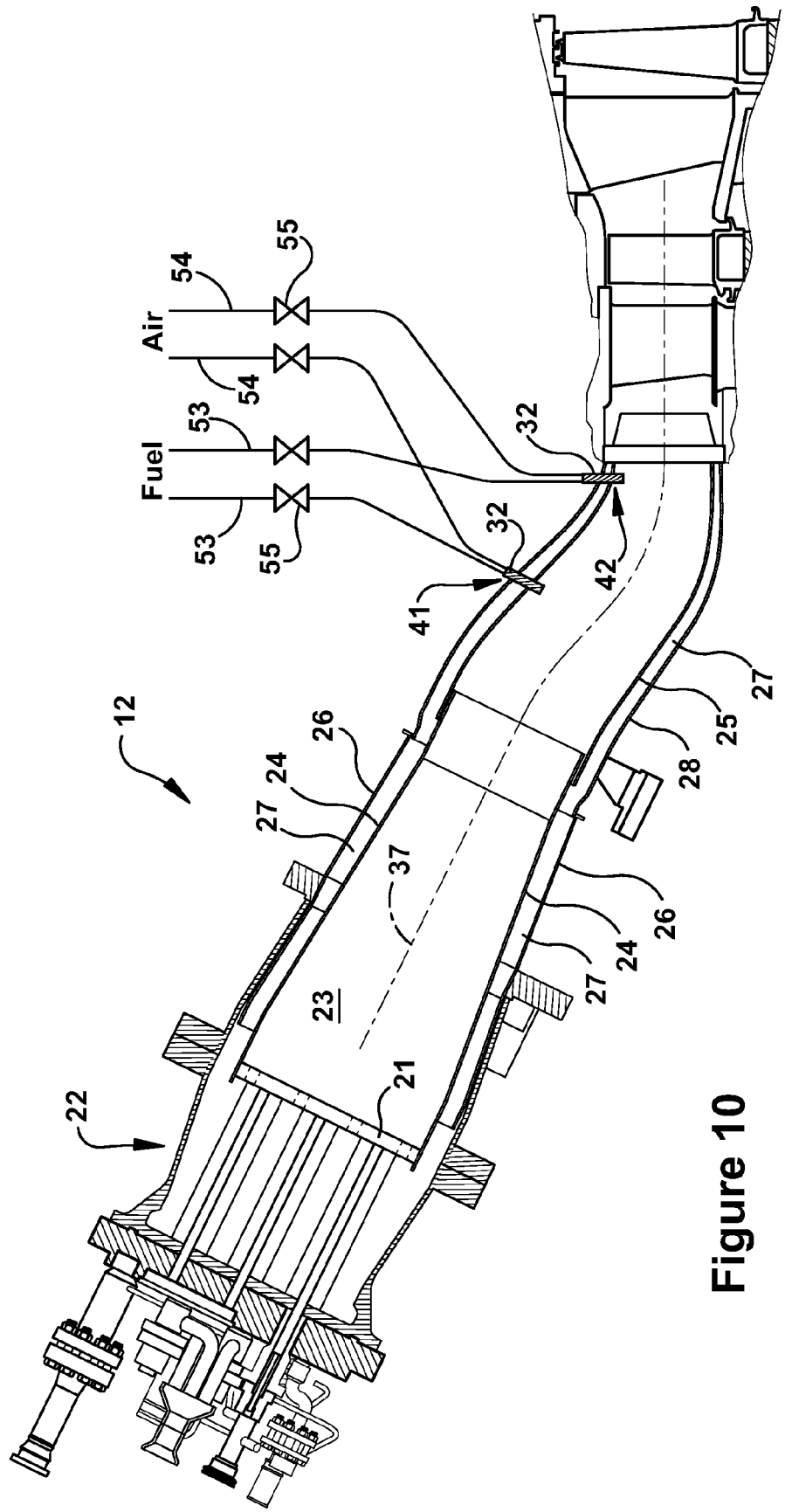
FIG. 10 is a sectional schematic representation of a combustor and the upstream stages of a turbine according to an alternative embodiment of the present invention.

The various injectors of the two injection stages may be controlled and configured in several ways so that desired operation and preferable air and fuel splitting are achieved. It will be appreciated that certain of these methods include aspects of U.S. Patent Application 2010/0170219, which is hereby incorporated by reference in its entirety. As represented schematically in FIG. 9, the air and fuel supplies to each of the stages 41, 42 may be controlled via a common control valve 55. That is, in certain embodiments, the air and fuel supply may be configured as a single system with common valve 55, and the desired air and fuel splits between the two stages may be determined passively via orifice sizing within the separate supply passages or injectors 32 of the two stages. As illustrated in FIG. 10, the air and fuel supply for each stage 41, 42 may be controlled independently with separate valves 55 controlling the feed for each stage 41, 42. It will be appreciated that any controllable valve mentioned herein may be connected electronically to a controller and have its settings manipulated via a controller pursuant to conventional systems.

The number of injectors 32 and each injector's circumferential location in the first stage 41 may be chosen so that the injected air and fuel penetrate the main combustor flow so to improve mixing and combustion. The injectors 32 may be adjusted so penetration into the main flow is sufficient so that air and fuel mix and react adequately during the brief residence time given the downstream position of the injection. The number of injectors 32 for the second stage 42 may be chosen to compliment the flow and temperature profiles that result from the first stage 41 injection. Further, the second stage may be configured to have less jet penetration in the flow of working fluid than that required for the first stage injection. As a result, more injection points may be located about the periphery of the flow path for the second stage compared to the first stage. Additionally, the number and type of first stage injectors 32 and the amounts of air and fuel injected at each may be chosen so to place combustible reactants at locations where temperature is low and/or CO concentration is high so to improve combustion and CO burnout. Preferably, the axial location of the first stage 41 should be as far aft as possible, consistent with the capability of the second stage 42 to foster reaction of CO/UHC that exits the first stage 41. Since the residence time of the second stage 42 injection is very brief, a relatively small fraction of fuel will be injected there, as provided above. The amount of second stage 42 air also may be minimized based on calculations and test data.

In certain preferred embodiments, the first stage 41 and the second stage 42 may be configured so that the injected air and fuel from the first stage 41 penetrate the combustion flow through the interior flowpath more than the injected air and fuel from the second stage 42. In such cases, as already mentioned, the second stage 42 may employ more injectors 32 (relative to the first stage 41) which are configured to produce a less forcible injection stream. It will be appreciated that, with this strategy, the injectors 32 of the first stage 41 may be configured primarily toward mixing the injected air and fuel they inject with the combustion flow in a middle region of the interior flowpath, while the injectors 32 of the second stage 42 are configured primarily mixing the injected air and fuel with the combustion flow in a periphery region of the interior flowpath.

Pursuant to aspects of the present invention, the two stages of downstream injection may be integrated so to improve function, reactant mixing, and combustion characteristic through the interior flowpath, while improving the efficiency regarding usage of the compressed air supply delivered to the combustor 13 during operation. That is, less injection air may be required to achieve performance advantages associated with downstream injection, which increases the amount of air supplied to the aft portions of the combustor 13 and the cooling effects this air provides. Consistent with this, in preferred embodiments, the circumferential placement of the injectors 32 of the first stage 41 includes a configuration from which the injected air and fuel penetrates predetermined areas of the interior flowpath based on an expected combustion flow from the primary air and fuel injection system so to increase reactant mixing and temperature uniformity in a combustion flow downstream of the first stage 41. Additionally, the circumferential placement of the injectors 32 of the second stage 42 may be one that compliments the circumferential placement of injectors 32 of the first stage 41 given a characteristic of the expected combustion flow downstream of the first stage 41. It will be appreciated that several different combustion flow characteristics are important to improving combustion through the combustor, which may benefit emission levels. These include, for example, reactant distribution, temperature profile, CO distribution, and UHC distribution within the combustion flow. It will be appreciated that such characteristics may be defined as the cross-sectional distribution of whichever flow property within the combustion flow at an axial location or range within the interior flowpath and that certain computer operating models may be used to predict such characteristics or they may be determined via experimentation or testing of actual engine operation or a combination of these. Typically, performance improved when the combustion flow is thoroughly mixed and uniform and that the integrated two-stage approach of the present invention may be used to achieve this. Accordingly, the circumferential placement of the injectors 32 of the first stage 41 and the second stage 42 may be based on: a) a characteristic of an anticipated combustion flow just upstream of the first stage 41 during operation; and b) the characteristic of an anticipated combustion flow just downstream of the second stage 42 given an anticipated effect of the air and fuel injection from the circumferential placement of the injectors 32 of the first stage 41 and the second stage 42. As stated, the characteristic here may be reactant distribution, temperature profile, NOx distribution, CO distribution, UHC distribution, or other relevant characteristic that may be used to model any of these. Taken separately, per another aspect of the present invention, the circumferential placement of the injectors 32 of the first stage 41 may be based on a characteristic of an anticipated combustion flow just upstream of the first stage 41 during operation, which may be based on the configuration of the primary air and fuel injection system 30. The circumferential placement of the injectors 32 of the second stage 42 may be based on the characteristic of an anticipated combustion flow just upstream of the second stage 42, which may be based on the circumferential placement of the injectors 32 of the first stage 41.

It will be appreciated that the integrated two stage downstream injection system 30 of the present invention has several advantages. First, the integrated system reduces the residence time by physically coupling the first and second stages, which allows the first stage 41 to be moved further downstream. Second, the integrated system allows the use of more and smaller injection points in the first stage because the second stage may be tailored to address non-desirable attributes of the resulting flow downstream of the first stage. Third, the inclusion of a second stage allows that each stage may be configured to penetrate less into the main flow as compared to a single stage system, which requires the usage of less "carrier" air to get the necessary penetration. This means less air will be siphoned from the cooling flow within the flow annulus, allowing the structure of the main combustor to operate at reduced temperatures. Fourth, the reduced residence time will allow higher combustor temperatures without increasing NOx emissions. Fifth, a single "dual manifold" arrangement can be used to simplify construction of the integrated two stage injection system, which makes the achievement of these various advantages cost-effective.

Turning now to an additional embodiment of the present invention, it will be appreciated that the positioning of the stages of injection may be based on residence time. As described, positioning of downstream injection stages may affect multiple combustion performance parameters, including, but not limited to, carbon monoxide emissions (CO). Positioning downstream stages too close to the primary stage may cause excessive carbon monoxide emissions when the downstream stages are not fueled. Hence, the flow from the primary zone must have time to react and consume the carbon monoxide prior to the first downstream stage of injection. It will be appreciated that this required time is the "residence time" of the flow, or, stated another way, the time it takes the flow of combustion materials to travel the distance between axially spaced injection stages. The residence time between two stages may be calculated on a bulk basis between any two locations based on the total volume between the locations and the volumetric flow rate, which may be calculated given the mode of operation for the gas turbine engine. The residence time between any two locations, therefore, may be calculated as volume divided by volumetric flow rate, where volumetric flow rate is the mass flow rate over density. Expressed another way, volumetric flow rate may be calculated as the mass flow rate multiplied by the temperature of the gases multiplied by the applicable gas constant divided by the pressure of the gases.

Accordingly, it has been determined that, given the concern over emission levels, including that of carbon monoxide, the first downstream injection stage should be no closer than 6 milliseconds (ms) from the primary fuel and air injection system at the head end of the combustor. That is, this residence time is the period of time during a certain mode of engine operation in which combustion flow takes to travel along the interior flowpath from a first position defined at the primary air and fuel injection system to a second position defined at the first stage of the downstream injection system. In this case, the first stage should be positioned a distance aft of the primary air and fuel injection system that equates to the first residence time being at least 6 ms. Additionally, it has been determined that from a NOx emissions standpoint, delaying downstream injection has a beneficial impact, and that the second downstream injection stage should be positioned less than 2 ms from the combustor exit or combustor end-plane. That is, this residence time is the period of time during a certain mode of engine operation in which combustion flow takes to travel along the interior flowpath from a first position defined at the second stage to a second position defined at a combustor end-plane. In this case, the second stage should be positioned a distance forward of the combustor end-plane that equates to this residence time being less than 2 ms.

Figure 11:
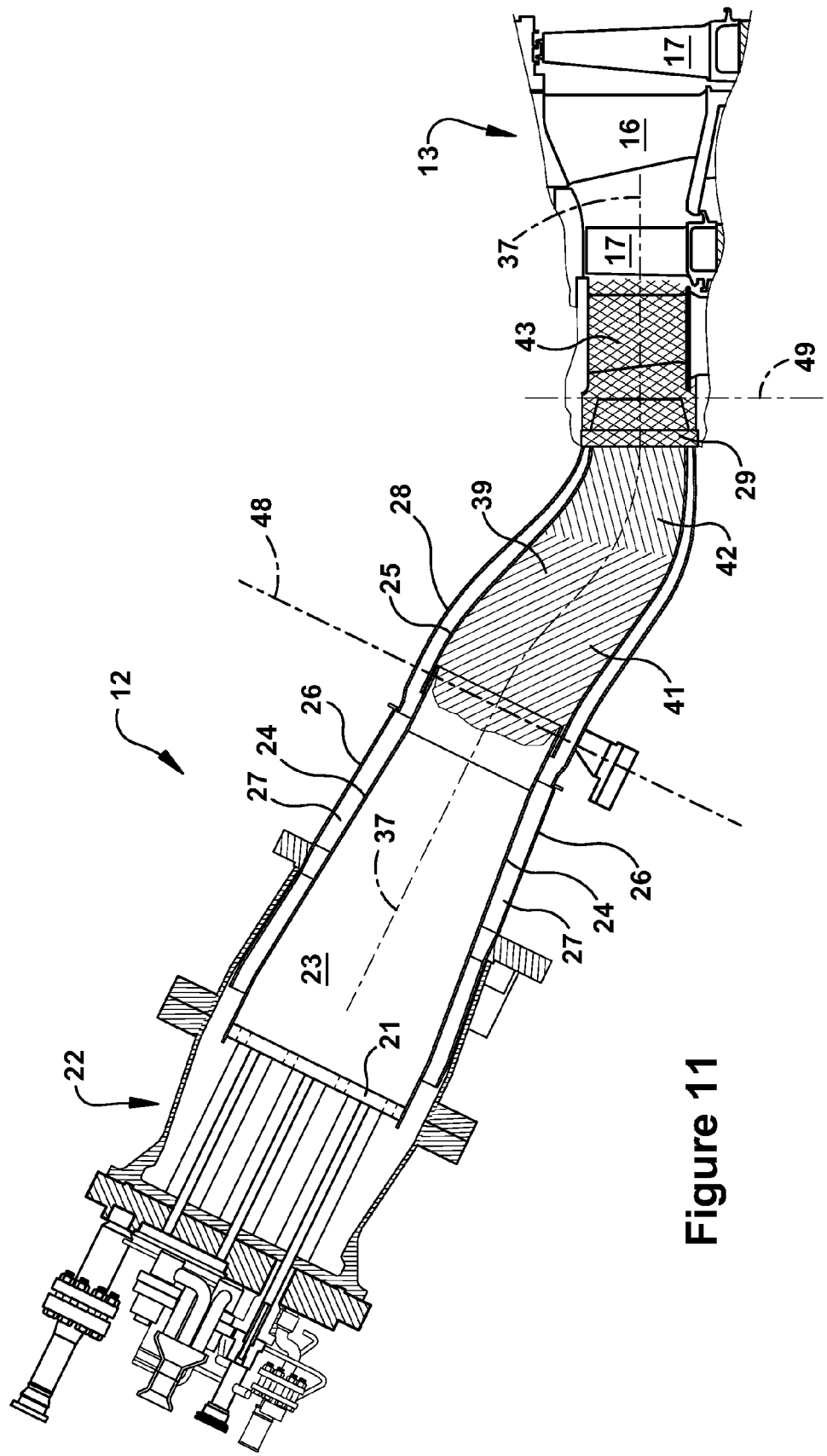
FIG. 11 is a sectional schematic representation of a combustor and the upstream stages of a turbine according to an alternative embodiment of the present invention.
Figure 12:
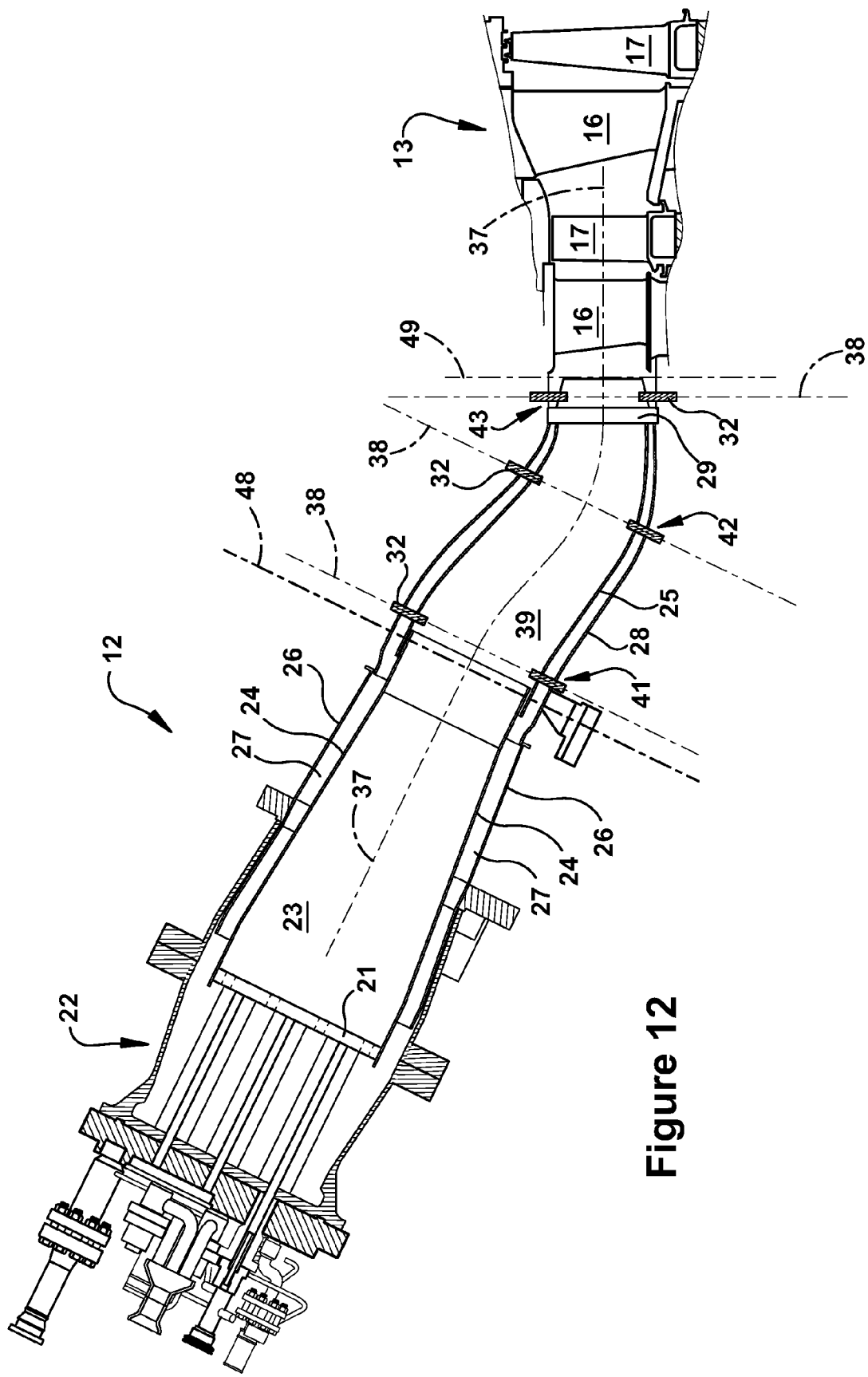
FIG. 12 is a sectional schematic representation of a combustor and the upstream stages of a turbine according to an alternative embodiment of the present invention.
Figure 13:
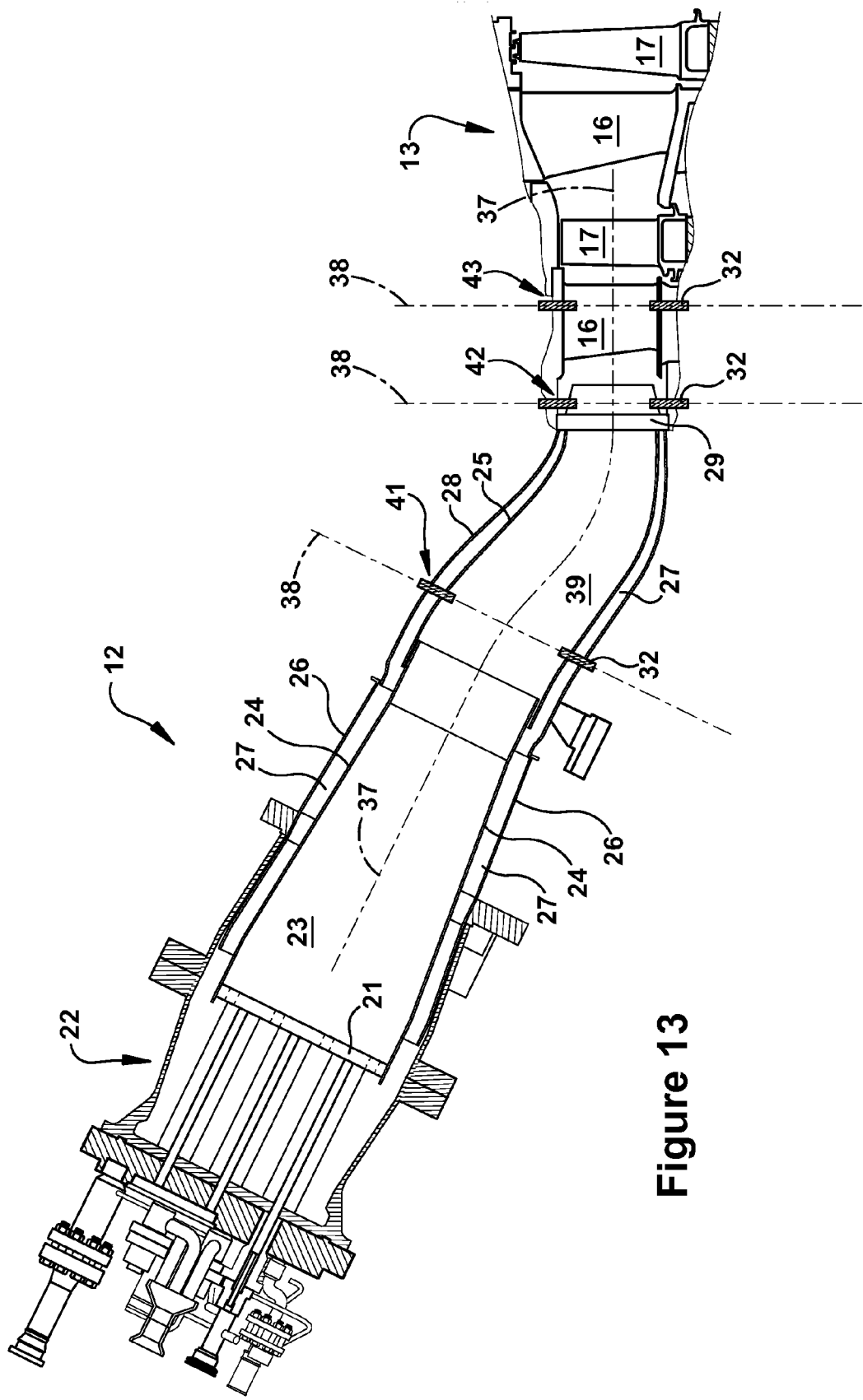
FIG. 13 is a sectional schematic representation of a combustor and the upstream stages of a turbine according to an alternative embodiment of the present invention.
Figure 14:
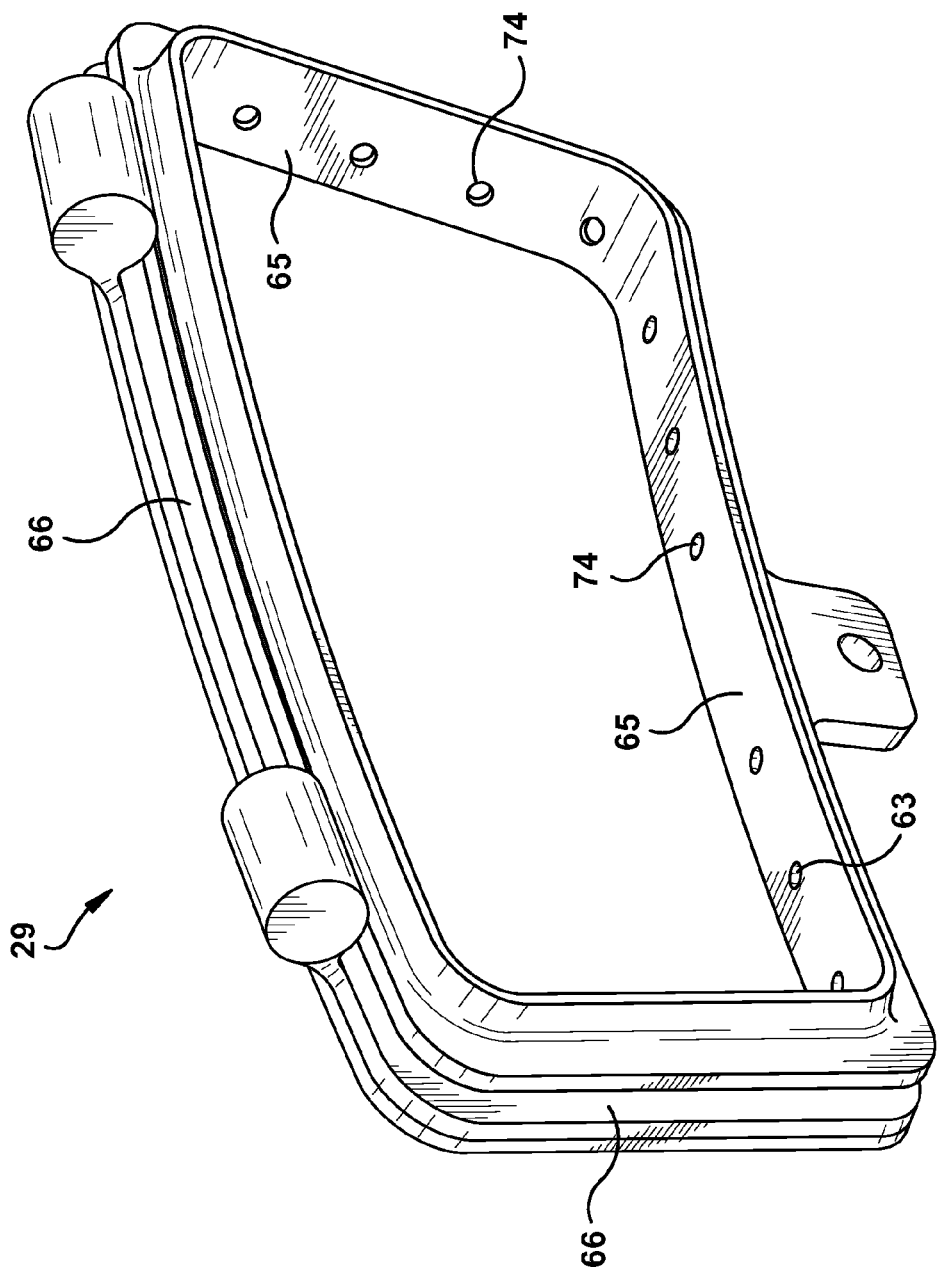
FIG. 14 is a perspective view of an aft frame according to certain aspects of the present invention.

FIGS. 11 through 14 illustrate a system with three injection stages. FIG. 11 illustrates axially ranges within which each of the three stages may be positioned. According to preferred embodiments, as shown in FIG. 11, the downstream injection system 30 of the present invention may include three axial stages of injection, a first stage 41, a second stage 42, and a third stage 43 that are positioned aft of the combustor mid-plane. More specifically, the first stage 41 may be positioned in the transition zone 39, the second stage 42 may be positioned near the combustor end plane 49, and the third stage may be positioned at or aft of the combustor end plane 49. FIGS. 12 and 14 provide certain preferred embodiments at which each of the three injection stages may be located within those ranges. As shown in FIG. 12, the first and second stage may be located within the transition zone, and the third stage may be located near the combustor end plane. As illustrated in FIG. 13, the first stage may be located within the transition zone, while the second and third stages, respectively, are located at the aft frame and first row of stator blades. In certain embodiments, as discussed above, the second stage may be integrated into the aft frame, while the third stage is integrated into the stator blades.

The present invention further describes fuel and air injection amounts and rates within a downstream injection system that includes three injection stages. In one embodiment, the first stage, the second stage, and the third stage includes a configuration that limits a fuel injected at the second stage to less than 50% of a fuel injected at the first stage, and a fuel injected at the third stage to less than 50% of the fuel injected at the first stage. In another preferred embodiment, the first stage, the second stage, and the third stage comprise a configuration that limits a fuel injected at the second stage to between 10% and 50% of a fuel injected at the first stage, and a fuel injected at the third stage to between 10% and 50% of the fuel injected at the first stage. In other preferred embodiments, the primary air and fuel injection system and the first stage, the second stage, and the third stage of the downstream injection system may be configured such that the following percentages of a total fuel supply are delivered to each during operation: between 50% and 80% delivered to the primary air and fuel injection system; between 20% and 40% delivered to the first stage; between 2% and 10% delivered to the second stage; and between 2% and 10% delivered to the third stage. In still other preferred embodiments, the primary air and fuel injection system and the first stage, the second stage, and the third stage of the downstream injection system are configured such that the following percentages of a total combustor air supply may be delivered to each during operation: between 60% and 85% delivered to the primary air and fuel injection system; between 15% and 35% delivered to the first stage; between 1% and 5% delivered to the second stage; and between 0% and 5% delivered to the third stage. In another preferred embodiment, the primary air and fuel injection system and the first stage, the second stage, and the third stage of the downstream injection system may be configured such that the following percentages of a total fuel supply are delivered to each during operation: about 65% delivered to the primary air and fuel injection system; about 25% delivered to the first stage; about 5% delivered to the second stage; and about 5% delivered to the third stage. In this case, the primary air and fuel injection system and the first stage, the second stage, and the third stage of the downstream injection system may be configured such that the following percentages of a total air supply are delivered to each during operation: about 78% delivered to the primary air and fuel injection system; about 18% delivered to the first stage; about 2% delivered to the second stage; and about 2% delivered to the third stage.

FIGS. 14 through 19 provide embodiments of another aspect of the present invention, which includes the manner in which fuel injectors may be incorporated into the aft frame 29. The aft frame 29, as stated, includes a framing member that provides the interface between the downstream end of the combustor 12 and the upstream end of the turbine 13.

As shown in FIG. 14, the aft frame 29 forms a rigid structural member that circumscribes or encircles the interior flowpath. The aft frame 29 includes an inner surface or wall 65 that defines an outboard boundary of the interior flowpath. The aft frame 29 includes an outer surface 66 that includes structural elements by which the aft frame connects to the combustor and turbine. A number of outlet ports 74 may be formed through the inner wall of the aft frame 29. The outlet ports 74 may be configured to connect the fuel plenum 71 to the interior flowpath 67. The aft frame 29 may include between 6 and 20 outlet ports, though more or less may also be provided. The outlet ports 74 may be circumferentially spaced about the inner wall 65 of the aft frame. As illustrated, the aft frame 29 may include an annular cross-sectional shape.

Figure 15:
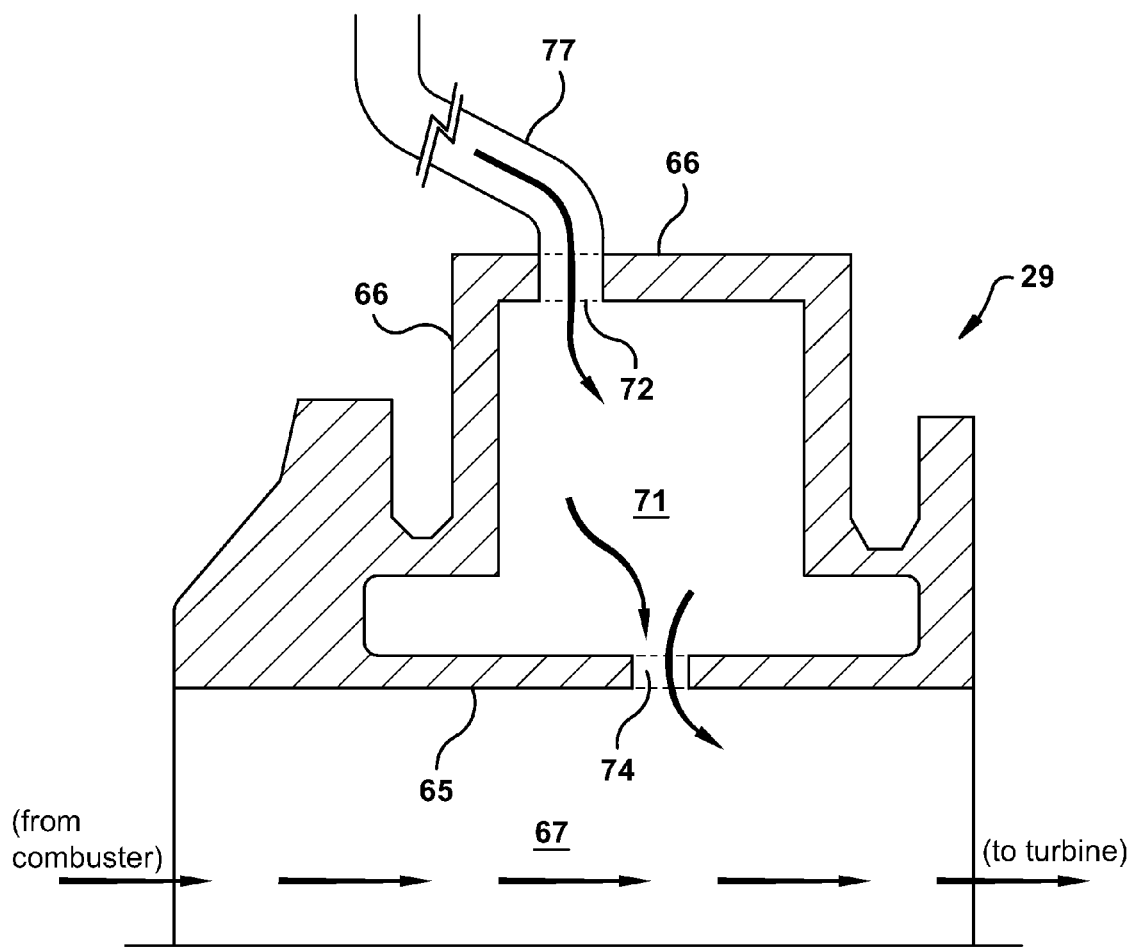
FIG. 15 is a sectional view of an aft frame according to certain aspects of the present invention.
Figure 16:
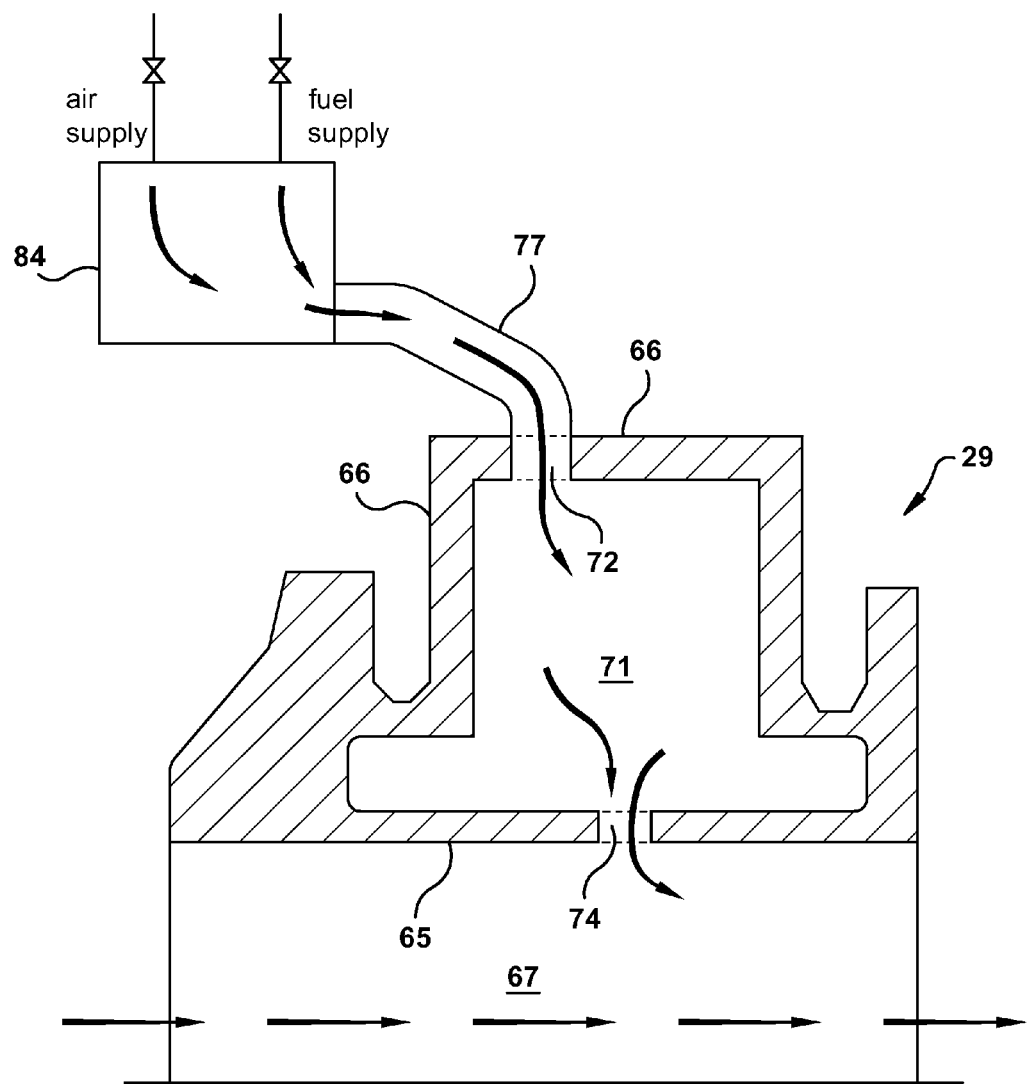
FIG. 16 is a sectional view of an aft frame according to certain aspects of the present invention.
Figure 17:
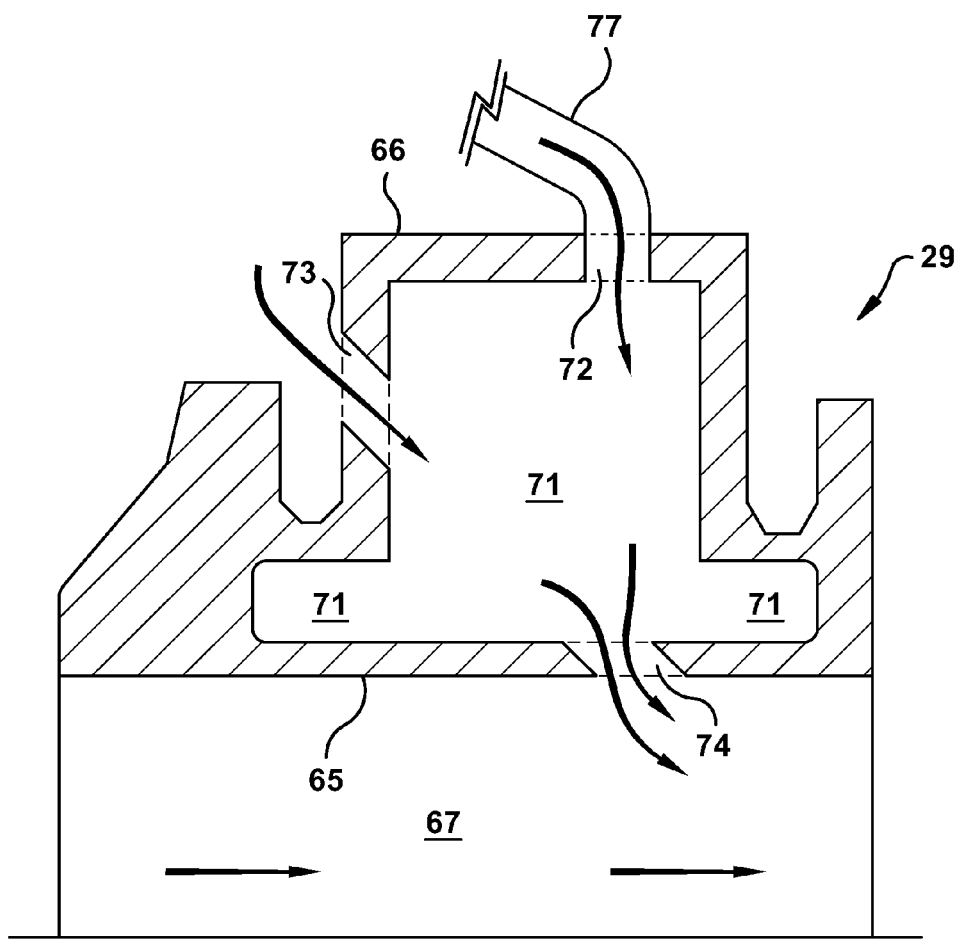
FIG. 17 is a sectional view of an aft frame according to certain aspects of the present invention.

As shown in FIGS. 15 through 19, the aft frame 29 according to the present invention may include a circumferentially extending fuel plenum 71 formed within it. As shown in FIG. 15, the fuel plenum 71 may have a fuel inlet port 72 that is formed through the outer wall 66 of the aft frame 29 and through which fuel is supplied to the fuel plenum 71. The fuel inlet port 72, thus, may connect the fuel plenum 71 to a fuel supply 77. The fuel plenum 77 may be configured to circumscribe or completely encircle the interior flowpath 67. As shown, once the fuel reaches the fuel plenum 71, it may then be injected into the interior flowpath 67 through the outlet ports 74. As shown in FIG. 16, in certain cases, air may be premixed with the fuel within a pre-mixer 84 before being delivered to the fuel plenum 71. Alternatively, air and fuel may be brought together and mixed within the fuel plenum 71, an example of which is illustrated in FIG. 17. In this case, air inlet ports 73 may be formed in the outer wall 66 of the aft frame 29 and may fluidly communicate with the fuel plenum 71. The air inlet ports 73 may be circumferentially spaced about the aft frame 29 and be fed by the compressor discharge that surrounds the combustor in this region.

As also shown in FIG. 17, the outlet ports 74 may be canted. This angle may be relative to a reference direction that is perpendicular to a combustion flow through the interior flowpath 67. In certain preferred embodiments, as illustrated, the cant of the outlet ports may be between 0° and 45° toward a downstream direction of the combustion flow. In addition, the outlet ports 74 may be configured flush relative to a surface of the inner wall 65 of the aft frame 29, as shown in FIG. 17. Alternatively, the outlet ports 74 may be configured so that each juts away from the inner wall 65 and into the interior flowpath 67, as shown in FIG. 19.

Figure 18:
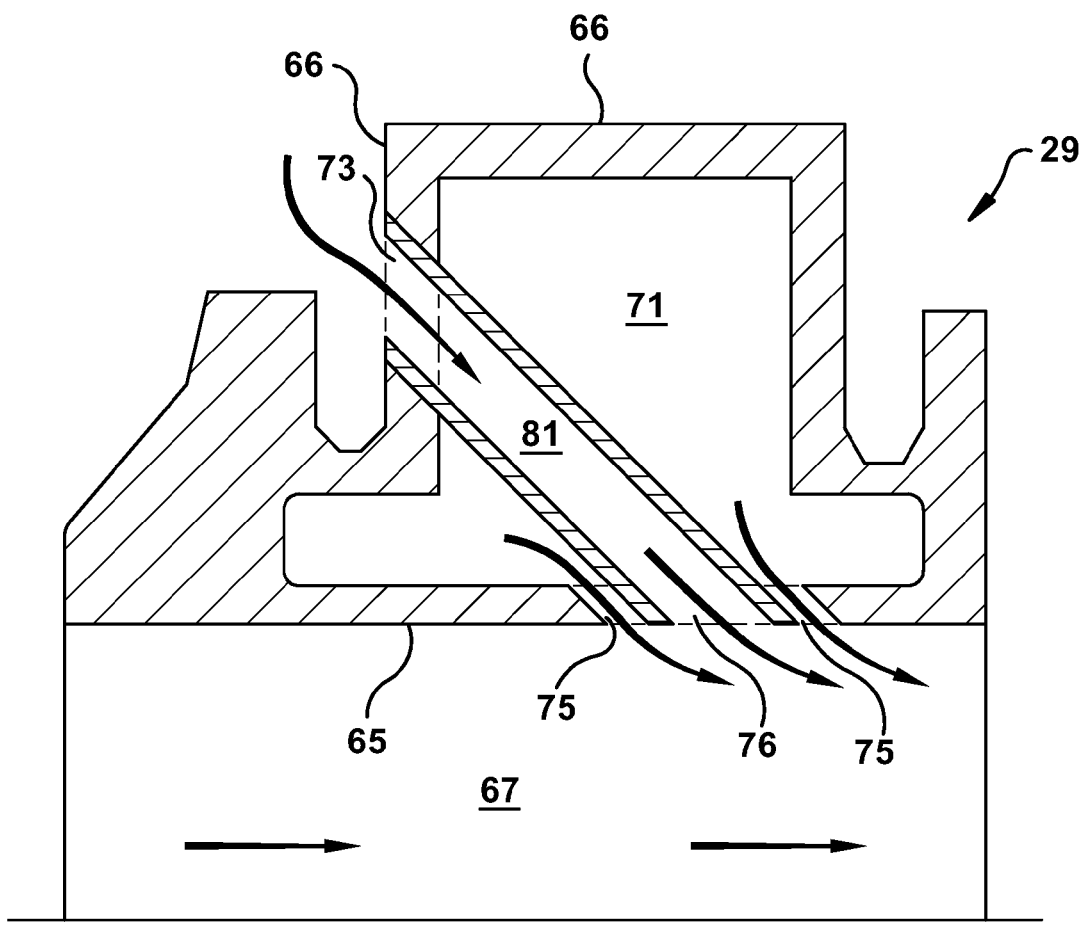
FIG. 18 is a sectional view of an aft frame according to certain aspects of the present invention.
Figure 19:
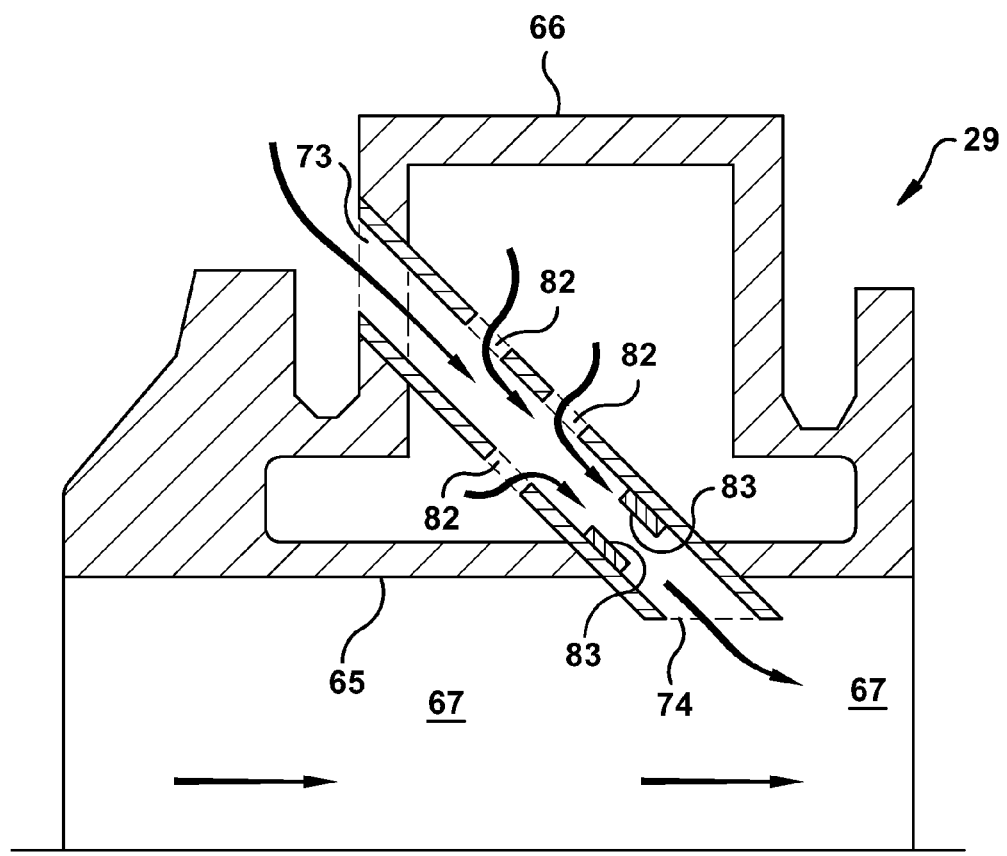
FIG. 19 is a sectional view of an aft frame according to certain aspects of the present invention.

FIGS. 18 and 19 provide an alternative embodiment in which a number of tubes 81 are configured to traverse the fuel plenum 71. Each of the tubes 81 may be configured so that a first end connects to one of the air inlet ports 73 and a second end connects to one of the outlet ports 74. In certain embodiments, as shown in FIG. 18, the outlet ports 74 formed on the inner surface 65 of the aft frame include: a) air outlet ports 76, which are configured to connect to one of the tubes 81; and b) fuel outlet ports 72, which are configured to connect to the fuel plenum 71. Each of these outlet ports may be positioned on the inner wall 65 in proximity to one another so to facilitate the mixing of air and fuel once injected into the interior flowpath 67. In a preferred embodiment, as illustrated in FIG. 18, the air outlet ports 76 are configured to have a circular shape and the fuel outlet port 75 are configured to have a ring shape formed about the circular shape of the air outlet ports 76. This configuration will further facilitate the mixing of fuel and air once it is delivered to the interior flowpath 67. It will be appreciated that in certain embodiments the tubes 81 will have a solid structure that prevents a fluid moving through the tube 81 from mixing with a fluid moving through the fuel plenum 71 until the two fluids are injected into the interior flowpath 67. Alternatively, as illustrated in FIG. 19 the tubes 71 may include openings 82 that allow for air and fuel to premix before being injected into the interior flowpath 67. In such cases, structure the promotes turbulent flow and mixing, for example, turbulators 83, may be included downstream of the openings 82 so that premixing is enhanced.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A gas turbine engine that includes:
   an interior flowpath defined through a combustor and a turbine;
   an aft frame forming an interface between the combustor and the turbine, the aft frame comprising a rigid structural member that circumscribes the interior flowpath, wherein the aft frame includes an inner wall that defines an outboard boundary of the interior flowpath;
   a circumferentially extending fuel plenum formed through the aft frame;
   outlet ports formed through the inner wall of the aft frame, the outlet ports being configured to connect the fuel plenum to the interior flowpath;
   air inlet ports formed through an outer wall of the aft frame; and
   tubes that traverse the fuel plenum;
   wherein:
      each of the tubes is configured so that a first end connects to one of the air inlet ports and a second end connects to one of the outlet ports;
      the outlet ports formed on the inner wall of the aft frame comprise: a) air outlet ports, which are configured to connect to one of the tubes; and b) fuel outlet ports, which are configured to connect to the fuel plenum;
      each of the fuel outlet ports is positioned in proximity to one of the air outlet ports; and
      the air outlet ports are configured having a circular shape and the fuel outlet ports are configured having a ring shape formed about one of the air outlet ports.

2. The gas turbine engine of claim 1, wherein the aft frame includes between 6 and 20 of the outlet ports;
   wherein the fuel plenum comprises a fuel inlet port, which is formed through the outer wall of the aft frame and fluidly connects the fuel inlet port to a fuel supply.

3. The gas turbine engine of claim 2, wherein the fuel plenum is configured to circumscribe the interior flowpath;
   wherein the outlet ports are circumferentially spaced about the interior flowpath;
   further comprising a pre-mixer upstream of the fuel inlet port, the pre-mixer comprising an air supply and the fuel supply as inputs.

4. The gas turbine engine of claim 1, wherein the outlet ports of the aft frame comprise a first injection stage of a downstream injection system that includes two injection stages;
   wherein a second stage of the downstream injection system is axially spaced forward or aft from the first stage along a longitudinal axis of the interior flowpath;
   wherein the first stage and the second stage of the downstream injection system each includes multiple injectors configured to inject an air and fuel into the interior flowpath.

5. The gas turbine engine of claim 4, wherein the combustor includes a primary air and fuel injection system toward a forward end, wherein the interior flowpath includes a primary combustion zone defined by a surrounding liner and, immediately aft of the liner, the interior flowpath includes a transition zone defined by a surrounding transition piece;
   wherein the transition piece is configured to fluidly couple the primary combustion zone to the turbine, the transition piece having a shape that transitions from a cylindrical cross-sectional shape of the liner to an annular cross-sectional shape of the turbine, wherein an aftward end of the transition piece comprises the aft frame;
   wherein the aft frame comprises a first connecting means by which the aft frame connects to the transition piece and a second connecting means by which the aft frame connects to the turbine; and
   wherein the aft frame comprises an annular cross-sectional shape.

6. The gas turbine engine of claim 1, wherein each of the outlet ports is configured flush relative to a surface of the inner wall of the aft frame.

7. The gas turbine engine of claim 1, wherein each of the outlet ports is configured to jut out from the inner wall of the aft frame so that the outlet port extends into the interior flowpath.

8. The gas turbine engine of claim 1, wherein the outlet ports are canted relative to a reference direction that is perpendicular to a combustion flow through the interior flowpath.

9. The gas turbine engine of claim 8, wherein the cant of the outlet ports comprises between 0° and 45° toward a downstream direction of the combustion flow.

10. The gas turbine engine of claim 1, wherein the air inlet ports are configured to fluidly connect a region exterior to the aft frame to the fuel plenum.

11. A gas turbine engine that includes:
   an interior flowpath defined through a combustor and a turbine;
   an aft frame forming an interface between the combustor and the turbine, the aft frame comprising a rigid structural member that circumscribes the interior flowpath, wherein the aft frame includes an inner wall that defines an outboard boundary of the interior flowpath;
   a circumferentially extending fuel plenum formed through the aft frame;
   outlet ports formed through the inner wall of the aft frame, the outlet ports being configured to connect the fuel plenum to the interior flowpath;
   air inlet ports formed through an outer wall of the aft frame; and
   tubes that traverse the fuel plenum;
   wherein:
      each of the tubes is configured so that a first end connects to one of the air inlet ports and a second end connects to one of the outlet ports;
      the outlet ports formed on the inner wall of the aft frame comprise: a) air outlet ports, which are configured to connect to one of the tubes; and b) fuel outlet ports, which are configured to connect to the fuel plenum;
      each of the fuel outlet ports is positioned in proximity to one of the air outlet ports; and
      each of the tubes comprises a solid structure configured such that a fluid moving through the tube is isolated from fluid moving through the fuel plenum.

* * * * *

UNITED STATES PATENT AND TRADEMARK OFFICE
CERTIFICATE OF CORRECTION

PATENT NO. : 9,528,439 B2
APPLICATION NO. : 13/836703
DATED : December 27, 2016
INVENTOR(S) : Graham et al.

It is certified that error appears in the above-identified patent and that said Letters Patent is hereby corrected as shown below:

On the Title Page

Item (57), under "ABSTRACT", in Column 2, Line 3, delete "combustor the" and insert -- combustor and the --, therefor.

In the Specification

In Column 1, Line 50, delete "combustor the" and insert -- combustor and the --, therefor.

In Column 4, Line 46, delete "section view" and insert -- sectional view --, therefor.

In Column 5, Line 7, delete "compressor 12" and insert -- compressor 11 --, therefor.

In Column 9, Lines 20-21, delete "combustor 13," and insert -- combustor 12, --, therefor.

In Column 9, Line 32, delete "embodiments" and insert -- embodiments, --, therefor.

In Column 11, Line 21, delete "combustor 13" and insert -- combustor 12 --, therefor.

In Column 11, Lines 24-25, delete "combustor 13" and insert -- combustor 12 --, therefor.

In Column 12, Line 23, delete "siphoned" and insert -- syphoned --, therefor.

In Column 14, Line 48, delete "fuel plenum 77" and insert -- fuel plenum 71 --, therefor.

In Column 15, Line 15, delete "outlet ports 72," and insert -- outlet ports 74, --, therefor.

Signed and Sealed this
Eleventh Day of April, 2017

Michelle K. Lee
*Director of the United States Patent and Trademark Office*

CERTIFICATE OF CORRECTION (continued)
U.S. Pat. No. 9,528,439 B2

In Column 15, Line 26, delete "embodiments" and insert -- embodiments, --, therefor.

In Column 15, Line 30, delete "tubes 71" and insert -- tubes 81 --, therefor.